US009258193B2

United States Patent
Kasslin et al.

(10) Patent No.: US 9,258,193 B2
(45) Date of Patent: Feb. 9, 2016

(54) METHOD, APPARATUS, AND COMPUTER PROGRAM PRODUCT FOR WIRELESS NETWORK CLUSTER DISCOVERY AND CONCURRENCY MANAGEMENT

(71) Applicant: Nokia Corporation, Espoo (FI)

(72) Inventors: Mika Kasslin, Espoo (FI); Enrico Rantala, Iittala (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 146 days.

(21) Appl. No.: 14/154,349

(22) Filed: Jan. 14, 2014

(65) Prior Publication Data

US 2015/0200811 A1     Jul. 16, 2015

(51) Int. Cl.
| | |
|---|---|
| *H04L 12/24* | (2006.01) |
| *H04W 8/00* | (2009.01) |
| *H04W 8/18* | (2009.01) |
| *H04W 48/18* | (2009.01) |
| *H04W 84/18* | (2009.01) |

(52) U.S. Cl.
CPC ............ *H04L 41/12* (2013.01); *H04L 41/0853* (2013.01); *H04W 8/005* (2013.01); *H04W 8/186* (2013.01); *H04W 48/18* (2013.01); *H04W 84/18* (2013.01)

(58) Field of Classification Search
CPC ... H04L 41/12; H04L 41/0853; H04W 8/005; H04W 8/186
See application file for complete search history.

(56) References Cited

U.S. PATENT DOCUMENTS

| | | |
|---|---|---|
| 2005/0185660 A1 | 8/2005 | Ekberg et al. |
| 2008/0137555 A1 | 6/2008 | Mahesh et al. |
| 2009/0003214 A1 | 1/2009 | Vaswani et al. |
| 2009/0234950 A1 | 9/2009 | Wikman et al. |
| 2010/0260067 A1 | 10/2010 | Palin et al. |

(Continued)

FOREIGN PATENT DOCUMENTS

WO    WO2013090317    6/2013

OTHER PUBLICATIONS

Extended European Search Report for Application No. 14197069.9-1854 dated Apr. 5, 2015.

(Continued)

*Primary Examiner* — Albert T Chou
(74) *Attorney, Agent, or Firm* — Locke Lord LLP

(57) ABSTRACT

Embodiments enable discovery of networks in a wireless communications medium. In example embodiments, a method comprises identifying, by an apparatus, a plurality of wireless network clusters by receiving wireless synchronization messages from one or more member devices of each of the plurality of wireless network clusters; calculating, by the apparatus, a cluster grade for each of the plurality of identified wireless network clusters based on information of the received wireless synchronization messages; selecting, by the apparatus, a wireless network cluster from the plurality of identified wireless network clusters, having a highest cluster grade for joining and operating in said wireless network cluster; and ranking, by the apparatus, non-selected wireless network clusters based on predefined criteria applied to information received by the apparatus characterizing the non-selected wireless network clusters.

21 Claims, 15 Drawing Sheets

(56) References Cited

U.S. PATENT DOCUMENTS

| | | |
|---|---|---|
| 2010/0274874 A1 | 10/2010 | Reunamaki |
| 2015/0081840 A1* | 3/2015 | Patil et al. .................... 709/217 |
| 2015/0098388 A1* | 4/2015 | Fang et al. ................... 370/328 |
| 2015/0109981 A1* | 4/2015 | Patil et al. .................... 370/311 |
| 2015/0131529 A1* | 5/2015 | Zhou et al. ................... 370/328 |

OTHER PUBLICATIONS

"FatVAP Agreegating AP Backhaul Capacity to Maximize Throughput", Oceedings of the 5th Usenix Symposium On Networked Systems Design & Implementation (NSDI '08): Apr. 16-18, 2008, San Francisco, CA, USA, Usenix Assoc, Berkeley, Calif, Apr. 16, 2008, pp. 89-103.

\* cited by examiner

FIG. 2

NAN SERVICE DISCOVERY FRAME 140

| FRAME CONTROL | DURATION | RECEIVE ADDRESS (NAN NETWORK ID) | TRANSMIT ADDRESS | SEQUENCE CONTROL | HT CONTROL | Cluster ID | NAN SERVICE DISCOVERY FRAME BODY 141 | CRC |
|---|---|---|---|---|---|---|---|---|

See Figure 4 And Figure 5

141

| Field | Size (Octets) | Value (Hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | TBD by WFA | Identifying the type and version of the NAN |
| NAN Attributes | Variable | Variable | One or more NAN Attributes |

NAN SERVICE DISCOVERY FRAME BODY

| Field | Size (octets) | Value | Description |
|---|---|---|---|
| Attribute ID | 1 | 0x02 | Identifies the type of NAN attribute. |
| Length | 2 | 2 | Length of the following fields in the attribute. |
| Service ID | 6*N | Variable | One or more Service IDs, where N is the number of Service IDs in this container. |

Service ID Attribute Format

| Field | Size (Octets) | Value (Hex) | Description |
|---|---|---|---|
| Attribute ID | 1 | 0x03 | Identifies the type of NAN attribute. |
| Service ID | 6 | Variable | Mandatory field that contains the hash of the Service Name. |
| Service Control | 1 | Variable | Mandatory field that defines the Service Control bitmap as defined in Table 5-16. |
| Matching Filter Length | 1 | Variable | An optional field and present if a matching service discovery filter is used. |
| Matching Filter | Variable | Variable | An optional field that is a sequence of length and value pairs that identify the matching service discovery filters, refer to Table 5-16. |
| Service Response Filter Length | 1 | Variable | An optional field and present if a service response filter is used. |
| Service Response Filter | Variable | Variable | An optional field that is a sequence of length and value pairs that identify the matching service response filters. |
| Service Info Length | 1 | Variable | An optional field and present if service specific information is used. |
| Service Info | 1 | Variable | An optional field that contains the service specific information. Its content may be determined by the application and not specified herein. |

Service Descriptor Attribute Format

FIG. 5

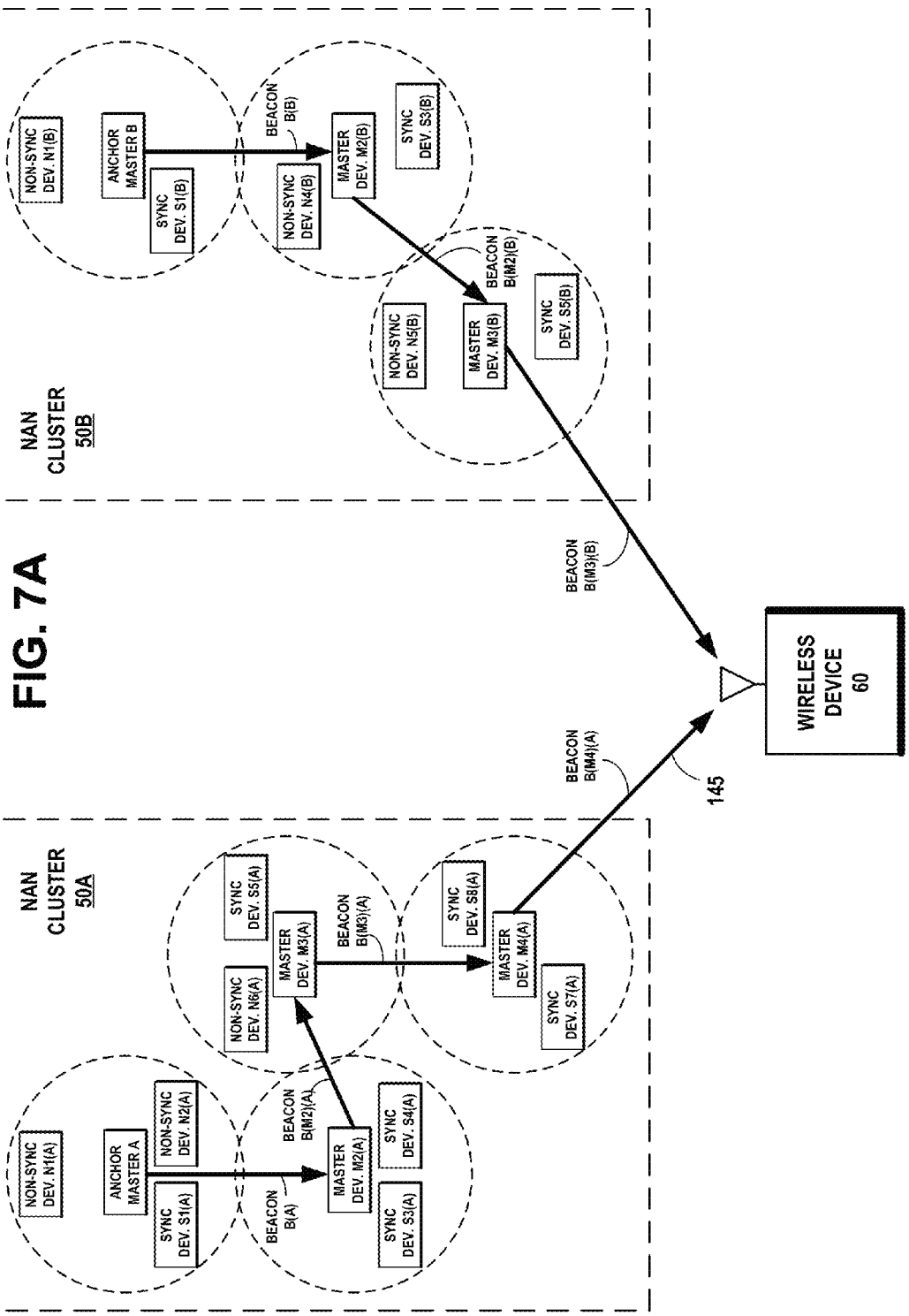

FIG. 7B

NAN SYNCHRONIZATION AND DISCOVERY BEACON FRAME 145

| FRAME CONTROL | DURATION | DESTINATION ADDRESS | SOURCE ADDRESS | Cluster ID | SEQUENCE CONTROL | TSF | BEACON INTERVAL | CAPABILITY | NAN IE 142 (FIGS 3, 4, & 5) | CRC |

FIG. 9a

| Cluster Identification | Measure of discoverability | Ranking result |
|---|---|---|
| : | : | : |
| : | : | : |
| : | : | : |
| : | : | : |

LIST OF AVAILABLE NAN CLUSTERS 150

FIG. 9b

| | Measure of discoverability Scanning | | | Measure of discoverability NAN Cluster participation | | | |
|---|---|---|---|---|---|---|---|
| Cluster ID | CC | SID match Beacon | Device count | SID match All frames | New device count | Last used (s) | Rank |
| A | 87 | 2 | 12 | 5 | 4 | 120 | 35 |
| B | 3619 | 2 | 25 | 18 | 9 | 0 | 50 |
| C | 499 | 3 | 20 | 11 | 11 | 0 | 80 |
| D | 6 | 0 | - | - | - | 99999 | 5 |
| E | 893 | 1 | 19 | 10 | 4 | 30 | 30 |

LIST OF AVAILABLE NAN CLUSTERS 150

FIG. 10a

Measure of discoverability: Scanning | Measure of discoverability: NAN Cluster participation

| Cluster ID | CC | SID match Beacon | Device count | SID match All NAN frames | New device count | Last used (s) | Rank |
|---|---|---|---|---|---|---|---|
| A | 87 | 2 | - | - | - | 99999 | 40 |
| B | 3619 | 2 | - | - | - | 99999 | 60 |
| C | 499 | 3 | - | - | - | 99999 | 70 |
| D | 6 | 0 | - | - | - | 99999 | 0 |
| E | 893 | 1 | - | - | - | 99999 | 30 |

LIST OF AVAILABLE NAN CLUSTERS 150 → (rows with Rank 60 and 70)

Two NAN Clusters in which the device starts operating after the start-up phase

FIG. 10b

Measure of discoverability: Scanning | Measure of discoverability: NAN Cluster participation

| Cluster ID | CC | SID match Beacon | Device count | SID match All NAN frames | New device count | Last used (s) | Rank |
|---|---|---|---|---|---|---|---|
| A | 87 | 2 | 12 | 5 | 4 | 0 | 35 |
| B | 3619 | 2 | 25 | 18 | 9 | 0 | 50 |
| C | 499 | 3 | 20 | 11 | 11 | 5 | 80 |
| D | 6 | 0 | - | - | - | 99999 | 5 |
| E | 893 | 1 | 19 | 10 | 4 | 30 | 30 |

LIST OF AVAILABLE NAN CLUSTERS 150 → (rows with Rank 35 and 50)

Two NAN Clusters in which the device operates at the time of the snapshot

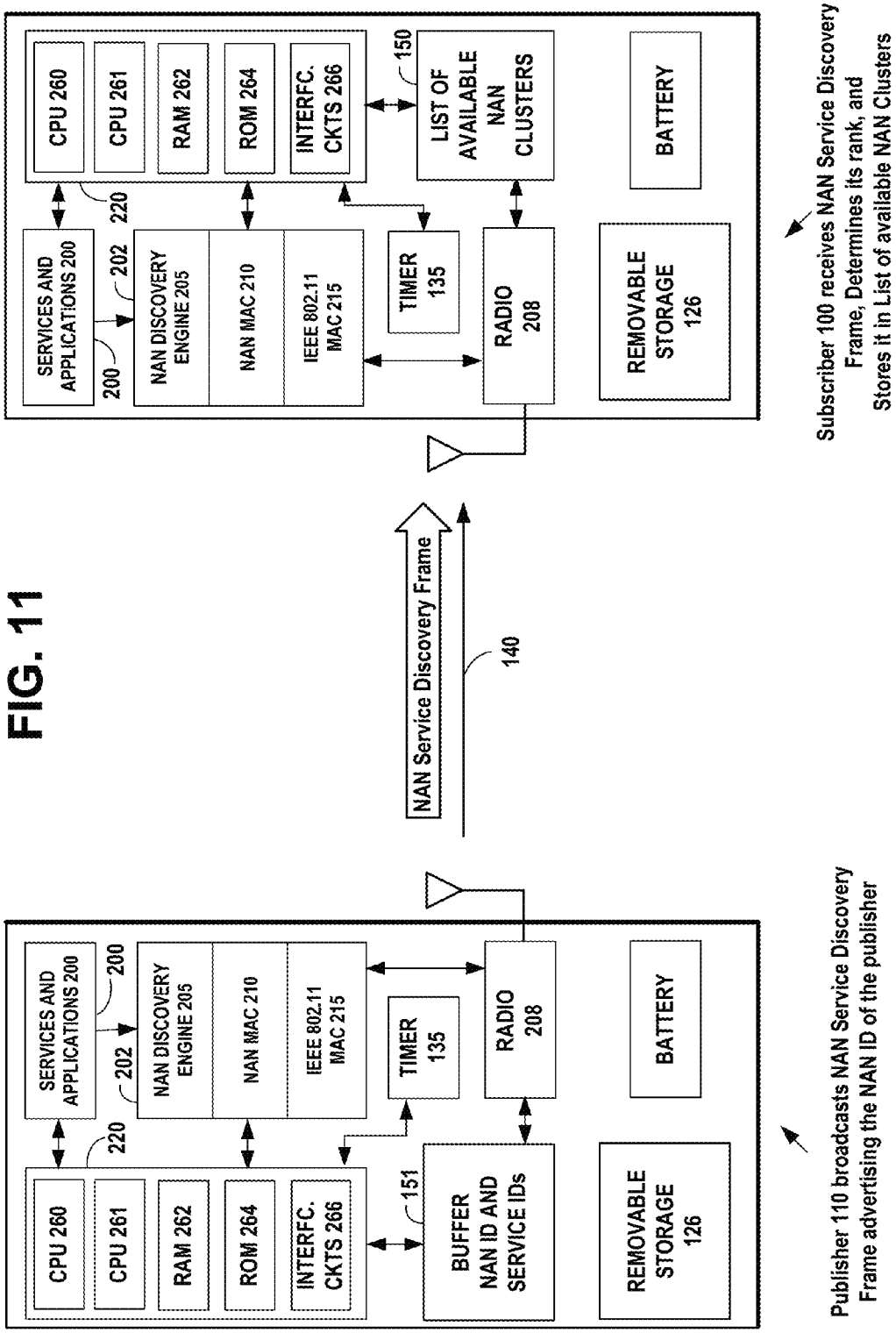

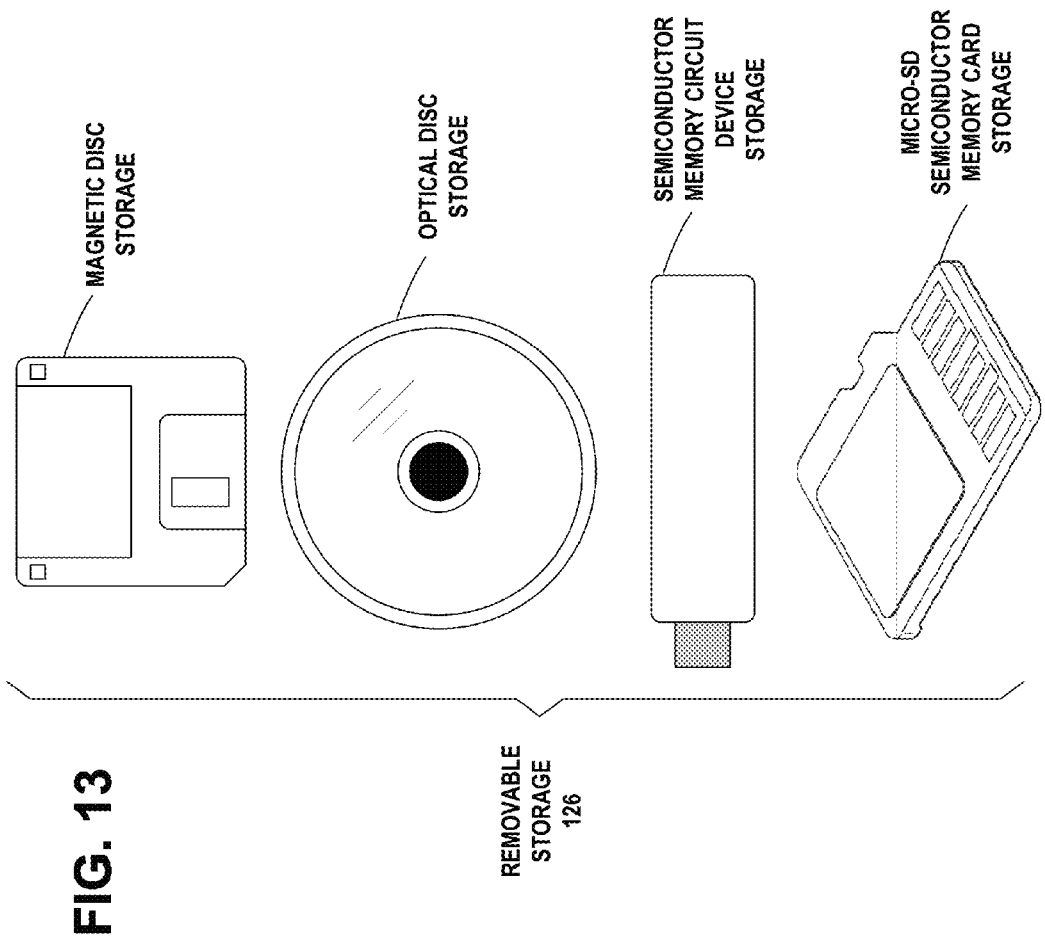

METHOD, APPARATUS, AND COMPUTER PROGRAM PRODUCT FOR WIRELESS NETWORK CLUSTER DISCOVERY AND CONCURRENCY MANAGEMENT

FIELD

The field of the invention relates to wireless short-range communication and more particularly to discovery of networks in a wireless communications medium.

BACKGROUND

Modern society has adopted, and is becoming reliant upon, wireless communication devices for various purposes, such as, connecting users of the wireless communication devices with other users. Wireless communication devices can vary from battery powered handheld devices to household and/or commercial devices utilizing electrical network as a power source. Due to rapid development of the wireless communication devices a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, such as GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy (LE), IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features that make them appropriate for various applications.

Applications for short-range wireless devices are evolving to include awareness applications providing the device with an awareness about the local network environment. Awareness applications have the promise of extending business and social networking by enabling users to share local contextual data in a peer-to-peer fashion by using their mobile wireless devices. For example, users may be able to share information in real-time for local-area business networking, social networking, dating, personal safety, advertising, publishing, and searching.

SUMMARY

Method, apparatus, and computer program product example embodiments enable discovery of networks in a wireless communications medium.

According to an example embodiment of the invention, a method comprises:

identifying, by an apparatus, a plurality of wireless network clusters by receiving wireless synchronization messages from one or more member devices of each of the plurality of wireless network clusters;

calculating, by the apparatus, a cluster grade for each of the plurality of identified wireless network clusters based on information of the received wireless synchronization messages;

selecting, by the apparatus, a wireless network cluster from the plurality of identified wireless network clusters, having a highest cluster grade for joining and operating in said wireless network cluster; and ranking, by the apparatus, non-selected wireless network clusters based on predefined criteria applied to information received by the apparatus characterizing the non-selected wireless network clusters.

According to an example embodiment of the invention, a method comprises:

determining, by the apparatus, whether to operate in one or more of the non-selected wireless network clusters based on the ranking of the non-selected wireless network clusters.

According to an example embodiment of the invention, a method comprises:

determining, by the apparatus, time allocations for operation in the one or more of the non-selected wireless network clusters based on the ranking of said one or more non-selected wireless network clusters.

According to an example embodiment of the invention, a method comprises:

wherein the predefined criteria includes counting a respective number of at least one of published and subscribed services for member devices of each of the non-selected wireless network clusters.

According to an example embodiment of the invention, a method comprises:

comparing the respective counts of the at least one of published and subscribed services for the member devices of each of the non-selected wireless network clusters; and ranking, by the apparatus, a wireless network cluster having a highest count from the non-selected wireless network clusters as highest ranked wireless network cluster from the non-selected wireless network clusters.

According to an example embodiment of the invention, a method comprises:

ranking, by the apparatus, a wireless network cluster having a highest cluster grade as highest ranked wireless network cluster from the non-selected wireless network clusters, if the respective counts are equivalent for the non-selected wireless network clusters.

According to an example embodiment of the invention, a method comprises:

wherein the predefined criteria is based on cluster grades calculated for each of the non-selected wireless network clusters.

According to an example embodiment of the invention, a method comprises:

maintaining, by the apparatus, a list of available wireless network clusters, the list containing those wireless network clusters in which the apparatus operates or has recently operated, and those other wireless network clusters that have been discovered by receiving one or more wireless synchronization messages from wireless devices in the other wireless network clusters.

According to an example embodiment of the invention, a method comprises:

maintaining, by the apparatus, a list of available wireless network clusters, the list containing those wireless network clusters in which the apparatus operates or has recently operated, and those other wireless network clusters that have been discovered by receiving one or more wireless synchronization messages from wireless devices in the other wireless network clusters; and passively scanning, by the apparatus, to discover wireless network clusters and after each scan, updating the list by deleting wireless network clusters that are no longer available.

According to an example embodiment of the invention, a method comprises:

controlling, by the apparatus, a number of wireless network clusters that the apparatus is capable of concurrently operating in, based on at least one of a battery level of a battery powering the apparatus and a duration required for the apparatus to perform other operations.

According to an example embodiment of the invention, an apparatus comprises:

at least one processor;

at least one memory including computer program code;

the at least one memory and the computer program code configured to, with the at least one processor, cause the apparatus at least to:

identify a plurality of wireless network clusters by receiving wireless synchronization messages from one or more member devices of each of the plurality of wireless network clusters;

calculate a cluster grade for each of the plurality of identified wireless network clusters based on information of the received wireless synchronization messages;

select a wireless network cluster from the plurality of identified wireless network clusters, having a highest cluster grade for joining and operating in said wireless network cluster; and rank non-selected wireless network clusters based on predefined criteria applied to information received by the apparatus characterizing the non-selected wireless network clusters.

According to an example embodiment of the invention, an apparatus comprises:

the at least one memory and the computer program code configured to, with the at least one processor, cause the apparatus at least to:

determine whether to operate in one or more of the non-selected wireless network clusters based on the ranking of the non-selected wireless network clusters.

According to an example embodiment of the invention, an apparatus comprises:

the at least one memory and the computer program code configured to, with the at least one processor, cause the apparatus at least to:

determine time allocations for operation in the one or more of the non-selected wireless network clusters based on the ranking of said one or more non-selected wireless network clusters.

According to an example embodiment of the invention, an apparatus comprises:

wherein the predefined criteria includes counting a respective number of at least one of published and subscribed services for member devices of each of the non-selected wireless network clusters.

According to an example embodiment of the invention, an apparatus comprises:

the at least one memory and the computer program code configured to, with the at least one processor, cause the apparatus at least to:

compare the respective counts of the at least one of published and subscribed services for the member devices of each of the non-selected wireless network clusters; and rank a wireless network cluster having a highest count from the non-selected wireless network clusters as highest ranked wireless network cluster from the non-selected wireless network clusters.

According to an example embodiment of the invention, an apparatus comprises:

the at least one memory and the computer program code configured to, with the at least one processor, cause the apparatus at least to:

rank a wireless network cluster having a highest cluster grade as highest ranked wireless network cluster from the non-selected wireless network clusters, if the respective counts are equivalent for the non-selected wireless network clusters.

According to an example embodiment of the invention, an apparatus comprises:

wherein the predefined criteria is based on cluster grades calculated for each of the non-selected wireless network clusters.

According to an example embodiment of the invention, an apparatus comprises:

the at least one memory and the computer program code configured to, with the at least one processor, cause the apparatus at least to:

maintain a list of available wireless network clusters, the list containing those wireless network clusters in which the apparatus operates or has recently operated, and those other wireless network clusters that have been discovered by receiving one or more wireless synchronization messages from wireless devices in the other wireless network clusters.

According to an example embodiment of the invention, an apparatus comprises:

the at least one memory and the computer program code configured to, with the at least one processor, cause the apparatus at least to:

maintain a list of available wireless network clusters, the list containing those wireless network clusters in which the apparatus operates or has recently operated, and those other wireless network clusters that have been discovered by receiving one or more wireless synchronization messages from wireless devices in the other wireless network clusters; and passively scanning, by the apparatus, to discover wireless network clusters and after each scan, updating the list by deleting wireless network clusters that are no longer available.

According to an example embodiment of the invention, an apparatus comprises:

the at least one memory and the computer program code configured to, with the at least one processor, cause the apparatus at least to:

control a number of wireless network clusters that the apparatus is capable of concurrently operating in, based on at least one of a battery level of a battery powering the apparatus and a duration required for the apparatus to perform other operations.

According to an example embodiment of the invention, a computer program product comprising computer executable program code recorded on a computer readable non-transitory storage medium, the computer executable program code comprising:

code for identifying, by an apparatus, a plurality of wireless network clusters by receiving wireless synchronization messages from one or more member devices of each of the plurality of wireless network clusters;

code for calculating, by the apparatus, a cluster grade for each of the plurality of identified wireless network clusters based on information of the received wireless synchronization messages;

code for selecting, by the apparatus, a wireless network cluster from the plurality of identified wireless network clusters, having a highest cluster grade for joining and operating in said wireless network cluster; and code for ranking, by the apparatus, non-selected wireless network clusters based on predefined criteria applied to information received by the apparatus characterizing the non-selected wireless network clusters.

DESCRIPTION OF THE FIGURES

FIG. 2 illustrates an example NAN Service Discovery Frame, in accordance with an example embodiment of the invention.

FIG. 5 illustrates an example Service Descriptor Attribute and Service ID Attribute, in accordance with an example embodiment of the invention.

FIG. 7A illustrates an example network diagram of two neighbor awareness network (NAN) clusters 50A and 50B, with anchor master A in NAN cluster 50A, with anchor master B in NAN cluster 50B, and a wireless device 60 in discovery mode, in accordance with at least one embodiment of the present invention.

FIG. 7B shows an example format of a beacon packet transmitted by a master device in a NAN cluster, in accordance with at least one embodiment of the present invention.

FIG. 9a illustrates an example Basic structure of NAN Cluster list, in accordance with an example embodiment of the invention.

FIG. 9b illustrates an example Detailed example of NAN Cluster list, in accordance with an example embodiment of the invention.

FIG. 10a illustrates an example NAN Cluster list showing a Start-up phase example, in accordance with an example embodiment of the invention.

FIG. 10b illustrates an example NAN Cluster list showing an Operational phase example, in accordance with an example embodiment of the invention.

FIG. 11 illustrates an example functional block diagram of NAN device, in accordance with at least one embodiment of the present invention.

FIG. 13 illustrates examples of removable storage media in a NAN device, in accordance with an example embodiment of the invention.

DISCUSSION OF EXAMPLE EMBODIMENTS OF THE INVENTION

Figure 1:
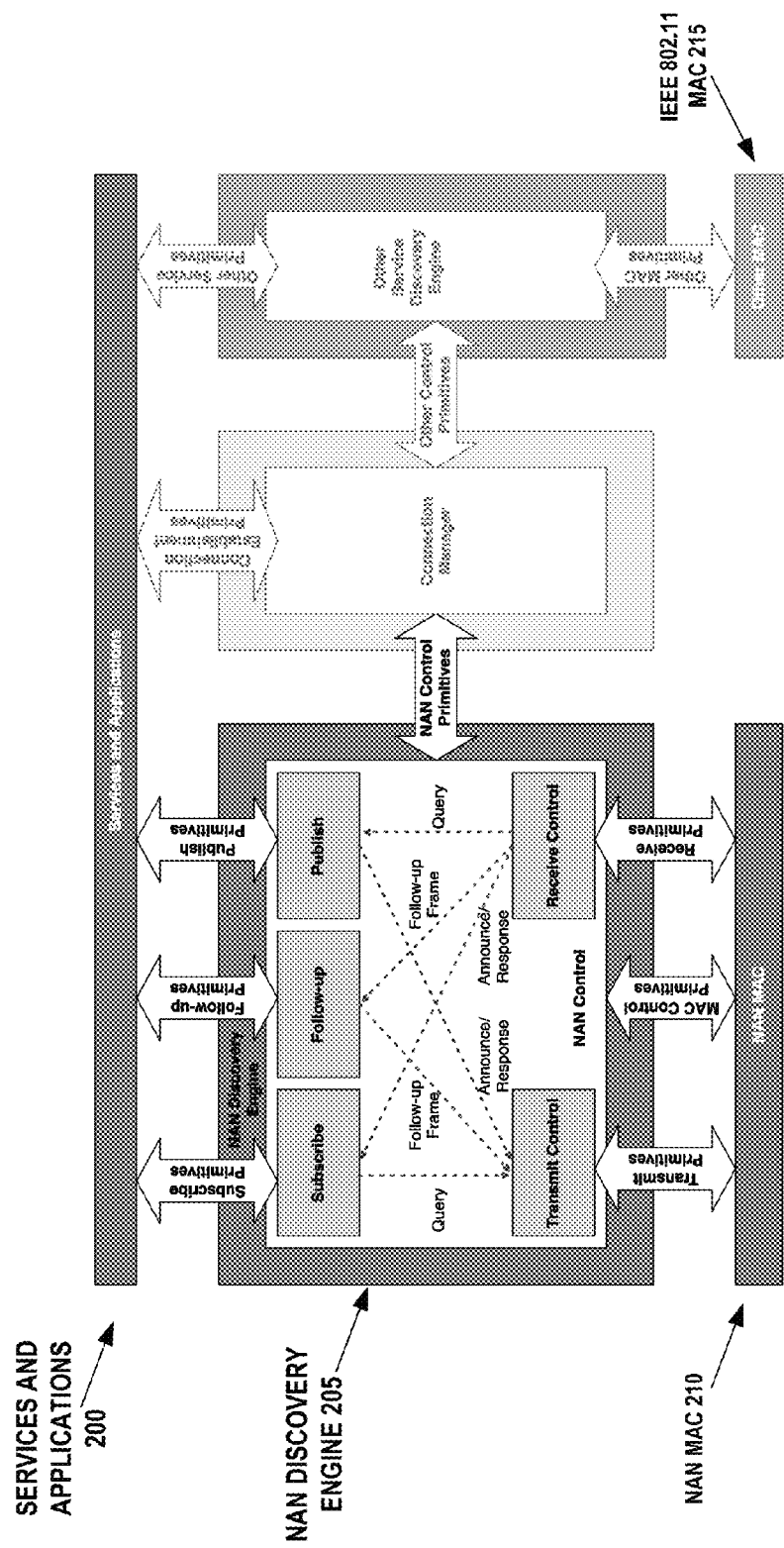
FIG. 1 illustrates an example NAN Discovery Engine, in accordance with an example embodiment of the invention. The NAN discovery engine is shown with other example components in the functional block diagram of a NAN device, shown in FIG. 11.

This section is organized into the following topics:
A. WLAN Communication Technology
B. Awareness Network Technology
C. Neighbor Awareness Networking (NAN)
D. NAN Cluster Concurrency Management
A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard *IEEE 802.11-2012, Wireless Medium Access Control (MAC) and Physical Layer (PHY) Specifications*, February 2012. Since then, emerging broadband applications have stimulated interest in developing very high-speed wireless networks for short range communication, for example, the planned IEEE 802.11 ac, and the planned IEEE 802.11 ad WLAN specifications that are to provide a very high throughput in various frequency bands. Applications of these IEEE 802.11 standards include products such as consumer electronics, telephones, personal computers, and access points for both for home and office.

A WLAN may be organized as an independent basic service set (IBSS) or an infrastructure basic service set (BSS). Wireless devices or stations (STAs) in an independent basic service set (IBSS) communicate directly with one another and there is no access point in the IBSS. WLAN ad hoc networks have an independent configuration where the mobile devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format is identical to that of an IEEE 48-bit address. In an ad hoc network, the BSSID is a locally administered, individual address that is generated randomly by the device that starts the ad hoc network.

Synchronization is the process of the devices in an ad hoc network getting in step with each other, so that reliable communication is possible. The MAC provides the synchronization mechanism to allow support of physical layers that make use of frequency hopping or other time-based mechanisms where the parameters of the physical layer change with time. The process involves beaconing to announce the presence of an ad hoc network, and inquiring to find an ad hoc network. Once an ad hoc network is found, a device joins the ad hoc network. This process is entirely distributed in ad hoc networks, and relies on a common time base provided by a timing synchronization function (TSF). The TSF may maintain a 64-bit timer running at 1 MHz and updated by information from other devices. When a device begins operation, it may reset the timer to zero. The timer may be updated by information received in beacon frames.

Each wireless device or STA maintains a TSF timer with modulus $2^{64}$ counting in increments of microseconds. STAs expect to receive Beacon frames at a nominal rate. The interval between Beacon frames is defined by a Beacon Period parameter of the STA. A STA sending a Beacon frame sets the value of the Beacon frame's timestamp so that it equals the value of the STA's TSF timer at the time that the data symbol containing the first bit of the timestamp is transmitted to the PHY plus the transmitting STA's delays through its local PHY from the MAC-PHY interface to its interface with the antenna or light-emitting diode (LED) emission surface.

In an ad hoc network, since there is no access point (AP) to act as the central time source for the ad hoc network, the timer synchronization mechanism is completely distributed among the mobile devices of the ad hoc network. Since there is no AP, the mobile device that starts the ad hoc network will begin by resetting its TSF timer to zero and transmitting a Beacon, choosing a beacon period. This establishes the basic beaconing process for this ad hoc network. After the ad hoc network has been established, each device in the ad hoc network will attempt to send a Beacon after the target beacon transmission time (TBTT) arrives. To minimize actual collisions of the transmitted Beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process is a purely local process that occurs entirely internal to the mobile device. There is no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

There are three major types of medium access control (MAC) frames in the IEEE 802.11 protocol: the management frame, the control frame, and the data frame. Management frames provide management services. Data frames carry payload data. Control frames assist in the delivery of data and management frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

1. Beacon

The beacon frame is a management frame that is transmitted periodically to allow mobile devices to locate and identify an ad hoc network. Beacon generation in an IBSS is distributed. The value of the beacon period is included in Beacon and Probe Response frames, and devices or STAs adopt that beacon period when joining the IBSS. All members of the IBSS participate in beacon generation. Each STA maintains its own TSF timer that is used for Beacon Period timing. The beacon interval within an IBSS is established by the STA when the START request primitive is performed within a device to create the IBSS. This defines a series of target beacon transmission times (TBTT) exactly a Beacon Period apart, which is the time at which an ad hoc device must send a beacon. Time zero is defined to be a TBTT. At each TBTT the STA waits for the random backoff interval and then sends a Beacon frame if the random delay has expired and no other Beacon frame has arrived from the IBSS of which the STA is a member during the delay period.

The beacon frame includes the fields: timestamp, beacon interval, and capability information. The timestamp contains the value of the device's synchronization timer (TSF) at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, an optional ad hoc network parameter set, and an optional traffic indication map. There is no restriction on the format or content of the 32 byte SSID.

The first ad hoc device to become active establishes an IBSS and starts sending beacons that to maintain synchronization among the devices. Other ad hoc devices may join the network after receiving a beacon and accepting the IBSS parameters, such as the beacon interval, found in the beacon frame.

Each device that joins the ad hoc network may send a beacon periodically if it doesn't hear a beacon from another device within a short random delay period after the beacon is supposed to be sent. If a device doesn't hear a beacon within the random delay period, then the device assumes that no other devices are active and a beacon needs to be sent. A beacon signal is periodically transmitted from the ad hoc network. The beacon frame is transmitted periodically and includes the address of the sending device.

2. Probe Request

The probe request frame is a management frame that is transmitted by a mobile device attempting to quickly locate a wireless LAN. It may be used to locate a wireless LAN with a particular SSID or to locate any wireless LAN. The probe request frame may contain the service attribute request. The effect of receiving a probe request is to cause the device to respond with a probe response. When a wireless device arrives within the communication range of any member of an ad hoc network, its probe request frame inquiry signals are answered by a member of the ad hoc network detecting the inquiry. A device in an ad hoc network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

For active scans, the WLAN radio may broadcast a probe request on the medium it is scanning using a broadcast SSID in the probe request. The WLAN radio will add any received beacons or probe responses to a cached basic service set identifier (BSSID) scan list. For passive scans, the WLAN radio does not send a probe request, but instead, listens on a medium for a period of time and adds any received beacons or probe responses to its cached BSSID scan list. The WLAN radio may scan both infrastructure and ad hoc networks, regardless of the current setting of its network mode. The WLAN radio may use either the active or passive scanning methods, or a combination of both scanning methods. When performing an active scan, the WLAN radio sets the BSSID to the broadcast MAC address in the probe request it sends. The WLAN radio performs the scan across all the frequency mediums and bands that it supports.

3. Probe Response

Devices or STAs in an IBSS respond to probe requests if it is awake at a given time to receive and respond to the probe requests. In an IBSS, a STA that sent a Beacon frame remains in the Awake state and responds to probe requests, until a Beacon frame with the current BSSID is received. There may be more than one STA in an IBSS that responds to any given probe request, particularly in cases where more than one STA transmitted a Beacon frame following the most recent TBTT, either due to not receiving successfully a previous Beacon frame or due to collisions between beacon transmissions. In an IBSS, STAs receiving Probe Request frames respond with a probe response when the SSID in the probe request is the wildcard SSID or matches the specific SSID of the STA. In an IBSS a STA that transmitted a Beacon frame since the last TBTT responds to group addressed Probe Request frames. A STA in an IBSS responds to Probe Request frames sent to the individual address of the STA. Probe Response frames are sent as directed frames to the address of the STA that generated the probe request.

4. Carrier Sense Multiple Access with Collision Avoidance (CSMA/CA)

According to an example embodiment, the IEEE 802.11 WLAN may use two types of transmission: Distributed Coordination Function (DCF) and Point Coordination Function (PCF). DCF employs Carrier Sense Multiple Access with Collision Avoidance (CSMA/CA). A packet sent may be positively acknowledged by the receiver. A transmission may begin with a Request to Send (RTS) and the receiver may respond with a Clear to Send (CTS). The channel may be cleared by these two messages, since all STAs that hear at least one of the CTS and the CTS may suppress their own start of a transmission. The Request to Send (RTS) packet sent by the sender and the Clear to Send (CTS) packet sent in reply by the intended receiver, may alert all other devices within range of the sender or the receiver, to refrain from transmitting for the duration of the main packet.

According to an example embodiment, when data packets are transmitted, each may have a Network Allocation Vector (NAV) containing a duration value to reserve the channel for the sender and receiver for an interval after the current packet, equal to the NAV duration. The network allocation vector (NAV) is an indicator that may be maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame may update their NAV with the information received in the duration field for all frames where the new NAV value is greater than the current NAV value, including the RTS and CTS packets, as well data packets. The value of the NAV decrements with the passage of time. Once the sender and receiver have reserved the channel, they may hold it for the remaining duration of the NAV value. The last acknowledgement packet (ACK) contains a NAV value of zero, to release the channel.

In a block acknowledgement (BA), instead of transmitting an individual ACK for every MAC protocol data unit (MPDU), multiple MPDUs may be acknowledged together using a single BA frame. Block Ack (BA) contains bitmap size of 64*16 bits. Each bit of this bitmap represents the success or failure status of a MPDU.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 wireless devices normally employ a spectrum sensing capability during the SIFS interval or DIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

According to an example embodiment, it may also be possible to start data transmission directly without RTS-CTS signaling and in that case, the first packet carries information similar to the RTS to start protection.

IEEE 802.11 wireless devices normally employ Carrier Sense Multiple Access (CSMA), wherein a spectrum sensing capability is used during an interval like the SIFS interval, DIFS interval or AIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle. Binary exponential backoff may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially.

The mobile device that starts an ad hoc network will begin by resetting its TSF timer to zero and transmitting a Beacon, choosing a beacon period, which establishes the basic beaconing process for this ad hoc network. After the ad hoc network has been established, each device in the ad hoc network will attempt to send a Beacon after the target beacon transmission time (TBTT) arrives, choosing a random delay value to avoid collisions. Each device in a beacon group receives a beacon including timing synchronization of the beacon group of which the device is a member. The synchronized devices in the beacon group should be simultaneously available during a discovery interval to listen for and to exchange messages. Discovery intervals may be aligned with TBTTs. The beginning of a discovery interval may be aligned with a TBTT or alternatively, a discovery interval may be deemed to start upon reception or transmission of a beacon after a TBTT.

5. Synchronization

Synchronization is the process of the devices in an ad hoc network getting in step with each other, so that reliable communication is possible. The MAC may provide the synchronization mechanism to allow support of physical layers that make use of frequency hopping or other time-based mechanisms where the parameters of the physical layer change with time. The process may involve beaconing to announce the presence of an ad hoc network, and inquiring to find an ad hoc network. Once an ad hoc network is found, a device may join the ad hoc network. This process may be entirely distributed in ad hoc networks, and may rely on a common timebase provided by a timer synchronization function (TSF). The TSF may maintain a 64-bit timer running at 1 MHz and updated by information from other devices. When a device begins operation, it may reset the timer to zero. The timer may be updated by information received in beacon frames.

Since there is no AP, the mobile device that starts the ad hoc network may begin by resetting its TSF timer to zero and transmitting a beacon, choosing a beacon period. This establishes the basic beaconing process for this ad hoc network. After the ad hoc network has been established, each device in the ad hoc network will attempt to send a beacon after the target beacon transmission time (TBTT) arrives. To minimize actual collisions of the transmitted beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process may be a purely local process that occurs entirely internal to the mobile device. There may be no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

6. Quality of Service (QoS)

The Quality of Service (QoS) support in the IEEE 802.11 WLAN protocol is provided by access categories (ACs) and multiple independent backoff entities. The Quality of Service (QoS) support defines the MAC procedures to support local area network (LAN) applications with quality of service (QoS) requirements, including the transport of voice, audio, and video.

Packets are delivered by parallel backoff entities operating within the same WLAN device, where backoff entities are prioritized using AC-specific contention parameters. There are four access categories (ACs) and thus, four backoff entities exist in every WLAN device. The AC-specific contention parameters are labeled according to their target application: AC_VO for voice or audio packets, AC_VI for video packets, AC_BE for packets whose delivery is on a best effort basis, and AC_BK for background packets. The four access categories (ACs) define the priorities in accessing the medium by setting individual interframe spaces, contention windows, and other medium access parameters per access category (AC).

Contention-based medium access is performed in every backoff entity by using different parameter values for the AC-specific contention parameters. The AC-specific contention parameters are announced via information fields in beacon frames. The same AC-specific contention parameters are used by the backoff entities different WLAN devices in the network.

Each backoff entity within a WLAN device independently contends for a transmit opportunity (TXOP) of a packet. It starts down-counting the backoff-counter after detecting the medium being idle for a duration defined by the arbitration interframe space (AIFS) that is based on the value of the AC-specific contention parameter of the packet to be transmitted. The arbitration interframe space (AIFS) defines the earliest access time that the WLAN device may transmit the packet. Voice packets that have the AC-specific contention parameter AC_VO and video packets that have the AC-specific contention parameter AC_VI have a high value for access priority. Best effort basis packets that have the AC-specific contention parameter AC_BE have a medium value for access priority. Background packets that have the AC-specific contention parameter AC_BK have a low value for access priority.

The minimum size of the contention window, CWmin, for transmission of a packet, is another parameter dependent on the AC-specific contention parameter. The smaller the CWmin, the higher the priority of the packet for accessing the medium. Voice packets that have the AC-specific contention parameter AC_VO have the smallest contention window whereas background packets that have the AC-specific contention parameter AC_BK have the longest contention window.

B. Awareness Network Technology

Applications for short-range wireless devices are evolving to include awareness applications providing the device with an awareness about the local network environment. A non-limiting example awareness network architecture is the Nokia AwareNet framework, a network of wireless mobile devices self-organizing to support various applications, ranging from social networking to service discovery. Awareness information may be shared by a short-range wireless device sending an anonymous flooding message that may include a query, over an ad hoc network. A neighboring short-range wireless device may reply to the flooding message over the ad hoc network with a response, such as a pointer to a discovered location-based service.

Awareness information may include any information and/or context about a local network environment as well as the users and communication devices within the local network environment. Wireless devices may continuously collect and exchange information with other devices in a local network environment. Awareness applications running on short-range wireless devices may create a network for sharing awareness information, locate and organize awareness information, form communities for sharing awareness information, manage power consumption for devices engaged in sharing awareness information, develop applications to take advantage of the awareness information, and maintain the privacy and anonymity of users sharing awareness information.

Awareness applications running on short-range wireless devices, build upon a scheme in which every device is responsible for participating in beaconing and all the other basic operations that keep the ad hoc network in operation. An ad hoc network may be designed to have one network identifier (NWID) that all of the devices in the network share. The NWID may be announced in the beacons transmitted by the devices. In the overall design, those devices that operate under same NWID are driven to use a common and shared schedule to allow for awareness information gathering among all the devices within range. The determination of which schedule is used by a device may be made by the network instance timer value, and this timer value is communicated in beacons in the timing synchronization function (TSF) value parameter. The devices may be required to operate by assuming the oldest TSF value (i.e. largest TSF value) contained in the received beacons that represent the network with the NWID in which the devices are operating. Alternatively the devices may be required to select the schedule which to follow based on some other criteria than the TSF value. Beacons may, as an example, contain some other information than the TSF that is used by the devices to determine which schedule to use.

When the radio and MAC of a wireless device transmits a Beacon, the Beacon MAC-header contains device's own current TSF value. The device may automatically transmit a reply message when it receives a Beacon from another network, the reply message being referred herein as a beacon response message. The beacon response message contains the current TSF value of the replying network. Alternatively the beacon response message may contain other information that is used to determine which schedule to use.

Wireless devices form a network where all devices in proximity may communicate with each other. When two or more groups of devices forming two or more instances of the network come close to each other, the two or more instances may merge to become one network instance. Devices may make a merging or join decision to change the instance autonomously based on the TSF information collected from Beacons received during scan periods or based on the TSF information collected from received beacon response messages. A merging decision may be performed when a device receives a Beacon or beacon response message with an older (greater) TSF value from another wireless device. Alternatively a merging decision may be done based on some other information available in a Beacon or beacon response message from another wireless device. After the merging decision has been performed by a device, the device moves into the new network instance.

The awareness functionality in a short-range wireless device may be divided between four layers in the awareness architecture. The Awareness Layer and the Community Layer provide services for applications, i.e. provide the awareness API. The approximate functional split between the different layers is as follows.

Awareness Layer

According to an embodiment, Awareness Layer (AwL) has the highest level of control of the awareness architecture. Example services the AwL offers to the applications comprise Publish and Subscribe. The Awareness Layer receives publish and subscribe requests from applications and maps these into queries and query responses that, in turn, are mapped as awareness messages, the Network Layer PDU, that traverse from device to device. It also maps the awareness messages received by the device, to the application. The network layer does not appear as a data pipe for applications. A single awareness message is self-contained and short, the AwL compresses the messages in order for them to consume as little resources as possible.

The Awareness Layer may comprise an internal storage of awareness data items. Publishing an item normally means storing it in this internal storage (passive publish). Such an item is visible to other devices in the local vicinity and may be found using the Subscribe service. It is also possible to use active publishing that causes the Awareness Layer to issue a publish message that propagates from device to device. It is the responsibility of the AwL to decide whether a received message leads to the notification of an application (filtering). Items may be marked to be visible to only certain communities, so that they are visible only to searches made by members of such a community.

The Subscribe request causes the Awareness Layer to issue either a single or repetitive query message(s) that eventually propagate to other devices in the local vicinity (by using the functionality of lower awareness layers). When such a query message reaches the AwL of a device that happens to possess a matching information item, it responds with a reply message. The lower layers of awareness architecture take care of the routing of such a message back to the AwL of the querying device, which notifies the application of the other device that issued the Subscribe request.

Community Layer

The concept of communities has been integrally built into awareness architecture. Awareness communication may be visible to all the devices, or just to those that belong to a certain community. Regardless of this visibility, all wireless devices take part in the routing of messages. The role of the Community Layer (CoL) is to implement the community visibility rules. Only those messages that a certain device has visibility to (i.e. a device belongs to the same community as the message) are passed to the AwL. As an additional level of community privacy, messages are encrypted by the Community Layer. To allow such message filtering and encryption/decryption, the CoL stores the community credentials for those communities to which the user of the device belongs. The default awareness community (all local users) does not use any credentials and therefore its messages simply pass through the Community Layer.

According to an example embodiment, Awareness architecture comprises three different kinds of communities: the default awareness community, peer communities and personal communities. Communities may also be categorized with their privacy. Messages of public communities are transmitted as plain text whereas messages of private communities are transmitted encrypted. The default awareness community is the default community for all wireless devices. Awareness community messages are not encrypted and every node may send and receive awareness community messages (public community). In a peer community all members are equal and every member may receive all the community specific messages. A peer community may be public, or it may be private meaning that community messages are encrypted using a temporary key derived from the community specific shared key. The encryption function may be based on Advanced Encryption Standard, EAX mode (AES/EAX) with 128 bit keys. A personal community has a community owner that manages the community. A non-owner community member may communicate with the owner but not with other members of the community. A personal community is private, meaning that community messages from the owner to other members may be encrypted.

Network Layer

The Network Layer (NL) takes care of the local dissemination of the awareness messages. This is accomplished by way of a smart-flooding algorithm that attempts to adapt to the surrounding device density. At high densities, very few devices participate in the transmission of a given message. At low densities, all the devices may retransmit each message (normal flooding). The awareness network has a flat hierarchy; none of the devices may assume any special roles. Thus, at high densities, all the devices will transmit approximately the same amount of traffic (no clustering). The Network layer may also take care of the routing of the replies back to the device that issued the search. To this end, it collects routing information from the messages that flow through it. It also keeps track of all the neighbors and their approximate distance. Normally, reply routing uses unicast transmissions, whereas flooding messages are always broadcasted. All the messages received by the Network Layer are passed to Community Layer in order to check whether the message should be processed in the AwL.

Link Layer

Link Layer performs the adaptation between the underlying radio technology (e.g. IEEE 802.11 WLAN physical layer) and the Network Layer. It maps the specific information of the radio technology, such as radio identifiers and received signal strengths, into technology neutral information used by the Network Layer (NL). Multiple Link Layer instances may be used by the NL, e.g. for simultaneous usage of different radio technologies.

The Link Layer may be divided into two sub layers: logical link control (LLC) and media access control (MAC). LLC provides radio technology agnostic service for the Network Layer. It hides differences between radio technology specific MACs. LLC provides a single service access point for the Network layer. LLC knows how to map the generic provided service to the service provided by the technology specific MACs. The LLC internal data structures include the Neighbor Table that contains information of all the neighboring devices that have been heard in the recent past.

The Link Layer tries to transmit data via the given medium using the TransmitData functionality. Transmission may succeed or it may fail. Internally the Link Layer may try transmissions several times if a medium is temporarily busy. The Link Layer passes all the messages it receives to the Network Layer. This also includes unicast messages that are intended for other nodes.

The logical link control (LLC) is aware of radio technology specific MACs. In case of the IEEE 802.11 WLAN MAC example, the LLC does the following WLAN MAC specific actions:

Control (Reset, Configure) WLAN MAC.
Decide when to merge WLAN networks.
Construct a message package to be sent to WLAN MAC from outgoing messages.
Select which messages are to be sent and which are ignored immediately, e.g. if there are too many messages to be sent.
Extract incoming data messages contained in reception reports.
Update the Neighbor Table when reception reports and scan reports are received.

Merging of WLAN networks may be the responsibility of the logical link control (LLC). The LLC may determine when to merge two WLAN network instances or beacon groups as a single larger network instance or a beacon group. LLC may calculate an estimate of its own WLAN network size. Estimation may be based on information provided by the Network Layer, information found in the LLC Neighbor Table and network size category shared by other nodes. A network size category is calculated from an estimated network size.

The IEEE 802.11 WLAN MAC awareness mode enables a wireless device to use its power efficiently. In the awareness mode, the WLAN radio is asleep most of the time, thus reducing power consumption. Messages are transmitted and received in a batch mode, i.e. LLC passes all the messages that the MAC is to transmit during a single awake period, in a single package. The MAC passes all the messages received during a single awake period in a single reception report. The LLC collects messages to be transmitted in a single package. When the MAC is awake, the LLC passes the package to the MAC and it tries to transmit the messages. When the MAC is about to go asleep, it sends a transmission report to the LLC containing information about messages it has succeeded to transmit and about messages it has failed to transmit. In addition MAC passes a reception report to LLC. The report contains messages received during the awake period.

According to an embodiment, the merging or joining process is a purely local process that occurs entirely internally to the wireless device. There is no indication to the outside world that a device has joined a particular ad hoc network. Joining an ad hoc network may require that all of the mobile device's MAC and physical parameters be synchronized with the desired ad hoc network. To do this, the device may update its timer with the TSF value of the timer from the ad hoc network description, modified by adding the time elapsed since the description was acquired. This will synchronize the device's timer to the ad hoc network. The BSSID of the ad hoc network may be adopted, as well as the parameters in the capability information field. Once this process is complete, the wireless device has joined the ad hoc network and is ready to begin communicating with the wireless devices in the ad hoc network.

The IEEE 802.11 WLAN MAC awareness mode provides the following functionalities:

Reset MAC.
Configure MAC.
Join a WLAN network or create a new network.
Join an existing WLAN network (BSSID is known).
Set a template for beacon frames so that LLC parameters can be passed in WLAN beacon frames.
Try to transmit a set of messages.
Receive a set of incoming messages.
Receive a set of WLAN scan messages
Message Propagation According to an embodiment, the propagation of an awareness search message is conducted in the awareness architecture layers of different devices. An application initiates a subscription in the device by using the Subscribe service offered by the Awareness Layer. The Awareness Layer realizes the subscription by sending a query message to other devices. In all the devices the message goes at least up to the Community Layer. However, only in those devices that belong to the community to which the message was intended, does the message proceed to the AwL. There is no need to have an application present in the replying device. It is sufficient to only have the awareness platform active.

C. Neighbor Awareness Networking (NAN)

In accordance with an example embodiment, the invention may be used in the logical architecture of the Neighbor Awareness Networking (NAN) program being standardized by the Wi-Fi Alliance (WFA). The NAN protocol stack is expected to comprise of two components: 1) NAN Discovery Engine, 2) MAC with NAN support. MAC with NAN support is a variant of Wi-Fi MAC and provides means for NAN devices to synchronize in time and frequency to provide common availability periods for service discovery frames from/to the NAN Discovery Engine.

NAN Discovery Engine

The NAN Discovery Engine provides Publish and Subscribe services to the applications for service discovery purposes.

Publishing is the ability to make application-selected information about e.g. capabilities and services available for other NAN devices that seek information with Subscribing, using protocols and mechanisms certified by the Neighbor Awareness Networking program. NAN devices that use Publishing may provide published information in an unsolicited or solicited manner.

Subscribing is the ability to discover information that has been made available in other NAN devices with Publishing, using protocols and mechanisms certified by the Neighbor Awareness Networking program. NAN devices that use Subscribing may passively listen for or actively seek published information.

Publish and Subscribe services are expected to exploit a discovery protocol that the NAN Discovery Engine implements and which is designed for NAN. The protocol is expected to have two different protocol messages: 1) Discovery query message, and 2) Discovery response message. The Subscribe service is expected to use the Discovery query message to conduct active discovery. The Subscribe service may be configured to operate in passive mode only. In this mode, no Discovery query messages are transmitted, but one listens for Discovery response messages to find the information sought. The Publishing service is expected to use the Discovery response message to announce availability of application-selected information to discovering devices.

A device in which the Subscribe service has been activated in active mode, transmits Discovery query messages to trigger Publishing devices to transmit Discovery response messages. In parallel, the Subscribing device monitors received Discovery response messages to determine the availability of services and information being sought. Monitoring is envisioned to be a continuous process that applies to all Discovery response messages received while the Subscribe service is active. With this approach, a Subscribing device may gather valuable information from Discovery response messages that are independent from its own Discovery query message transmissions.

MAC with NAN Support

The MAC is responsible for acquiring and maintaining time and frequency synchronization among devices that are close by, so that the devices are available for discovery protocol message exchange in same channel at same time. Synchronization happens through dedicated synchronization frames that are transmitted by so called master devices (on default) at the beginning of the availability periods. Sync frames are transmitted periodically in certain channels. Periodicity and channel usage is determined by sync frame parameters. Each device needs to be capable of acting as a master device and each device is expected to determine for each availability period whether it is a master device or not. This determination is done through a master election algorithm. The synchronization frames determine the schedule (time and frequency) of both the synchronization frame transmissions and the availability periods or discovery windows.

A NAN network is comprised of a set of NAN devices that operate under a common network identifier (NAN ID) and that share common sync frame and discovery window parameters. A NAN network comprises of one or more NAN clusters. Each NAN cluster may be a contention group or beacon group and may be considered a local representation of a NAN network. A NAN cluster is comprised of a set of NAN devices that operate in a NAN network with one NAN ID and which are synchronized with respect to both the sync frame transmissions and the discovery windows. In order for NAN devices to form a NAN cluster, at least some of them need to be within range of each other. The NAN ID is carried at least in NAN service discovery frames and may be carried as well in synchronization frames that may be of a beacon frame format. Each NAN service discovery and synchronization frame may also contain a NAN Cluster identifier (ID) field that is used in a NAN device receiving a frame, to determine, as an example, whether the frame is from a NAN network and from a NAN cluster in which the NAN device is operating and from what type of NAN network the frame was transmitted. In one embodiment of the invention, the NAN ID is a numerical value that is indicated with a 6-octet field in NAN service discovery frames used in the NAN networks, to provide service discovery within NAN clusters. In one embodiment of the invention, the NAN Cluster ID is a numerical value that is indicated with a 6-octet field in beacons or in synchronization frames used in the NAN networks, to provide basic synchronization within NAN clusters. In one embodiment of the invention, there is no NAN cluster identifier that would be carried in beacon frames, but NAN cells are differentiated with different schedules especially from perspective of sync frame (beacon) schedule.

The NAN Discovery Engine leverages a variant of the Wi-Fi MAC which has features that have been specifically developed to allow low power discovery directly between devices within range. This MAC with NAN support provides synchronization in addition to frame transmit and receive services. The objective of the synchronization is to make all the NAN devices within range available for service discovery exchange at same time on same frequency channel. The synchronization builds upon Beacon frame transmissions in which all the NAN devices are involved. Beacon frames are transmitted periodically and they serve also as NAN network instance identifiers for devices that look for NAN network instances (NAN cluster is a NAN network instance). A NAN device which looks for a NAN network instance uses traditional Wi-Fi passive scanning by listening for Beacon frames from NAN devices. Typically a NAN device performs passive scanning once in 10-20 seconds and each scan lasts 200-300 ms each. Once a NAN device finds out one or more NAN network instances, it selects the instance to which it synchronizes and starts operating in.

Basic Principles of NAN Operations:

Upon activating the NAN functions in a device, the device first looks for a NAN network by means of passive discovery. The NAN functions are activated by an application in the device requesting either the Subscribe or the Publish service to be activated, when there is no service active in the NAN Discovery Engine.

a) On default there is at least one NAN ID that is determined in a NAN specification and the NAN device looks for such a network and its clusters.

Joining a NAN network/NAN cluster: If the device finds at least one NAN cluster that the device may join, the device selects a cluster and joins it. If the device finds no NAN cluster that the device may join, the device establishes a NAN cluster of its own. An application may have also requested the Publish service to be activated in a passive mode. In such case the device doesn't ever establish a NAN cluster, but it only operates in NAN clusters that have been established by others.

a) A NAN device may join a NAN cluster when the following criterion is met:

1. The device receives at least one sync frame from the cluster with signal level exceeding a pre-determined threshold RSSI_C (e.g. −50 dBm).

Upon joining a NAN cluster a NAN device synchronizes itself both to the sync frame transmission and discovery window schedule of the cluster.

a) Additionally, the device is responsible for running the master election algorithm to determine whether it is a master device that is responsible for transmitting a sync frame.

Once in a NAN cluster, a NAN device may continue operating in it, as long as one of the following criteria is met:

a) The device receives at least one sync frame from the cluster with signal level exceeding a pre-determined threshold RSSI_C (e.g. −50 dBm).

b) The device operates as a master device transmitting sync frames.

When operating in a NAN cluster, a NAN device is responsible for maintaining both the base clock of the cluster by transmitting sync frames as needed and the discovery window schedule of the cluster.

Additionally, a NAN device is responsible for conducting passive discovery once in a while to figure out whether there are other NAN clusters within range that that the device should consider joining a) When a NAN device detects a sync frame of a NAN cluster different from the one in which the device operates, but both the clusters belong to the NAN network the device operates in, and the sync frame is received with signal level exceeding a pre-determined threshold RSSI_C (e.g. −50 dBm), the device proceeds as follows:

1. If the sync frame from the foreign cluster contains parameter values that indicate preference of the foreign cluster over one's own cluster, the device moves its operations to the foreign cluster.

2. Otherwise the device continues its operations in the current cluster.

Neighbor Awareness Networking Network

A NAN network is comprised of a set of NAN devices that operate under a common network identifier (NAN ID) and that share common sync frame and discovery window parameters.

A NAN network is comprised of one or more NAN clusters.

Cluster

A set of NAN devices that operate in a NAN network with one NAN ID and that are synchronized with respect to both the sync frame transmissions and the discovery windows form a NAN cluster.

In order for NAN devices to form a NAN cluster, at least some of them need to be within range of each other.

Synchronization within a NAN cluster means that the devices share the burden of sync frame transmission and are available simultaneously for NAN discovery during discovery windows.

Sync Frames

Sync frames form the basis of time and frequency synchronization in the NAN network. All the NAN devices are responsible for participating in sync frame transmission, as per master role selection rules.

Sync frames are transmitted as per sync frame parameters that determine how often and in which channel(s) the frames are transmitted.

Sync frames provide a base clock for NAN devices and the base clock is used as the reference when specifying the discovery window schedule.

The base clock builds upon the time synchronization function (TSF) that is used in WLAN, and each sync frame is expected to contain a TSF timestamp value indicator.

A sync frame may be realized as a Beacon frame.

Discovery Window

A discovery window is a time period during which NAN devices are available for NAN discovery frame exchange.

Discovery windows happen as per discovery window parameters that determine how often and in which channel(s) the windows happen.

Discovery window schedule builds upon the information available in sync frames.

Device Operations in a NAN Network

Upon activating the NAN in a device, the device first looks for a NAN network by means of passive discovery.

On default, there is one default NAN ID that is determined in a NAN specification and the NAN device looks for such a network and its clusters.

Joining a NAN network/NAN cluster:

If the device finds at least one NAN cluster that the device may join, the device selects a cluster and joins it.

If the device finds no NAN cluster that the device may join, the device establishes a NAN cluster of its own. If the NAN Discovery Engine has been requested to activate the Subscribe service in a passive mode, the device may also decide not to establish a NAN cluster of its own, but it only operates in NAN clusters it discovers.

When a NAN device operates in a NAN cluster, it periodically conducts passive discovery to find out whether other NAN clusters of the NAN network in which the device operates, are available.

Joining a NAN Cluster

A NAN device may join a NAN cluster when the following criterion is met:

The device receives at least one sync frame from the cluster with signal level exceeding a pre-determined threshold RSSI_C (e.g. −50 dBm).

Upon joining a NAN cluster, a NAN device synchronizes itself both to the sync frame transmission and discovery window schedule of the cluster.

Additionally, the device is responsible for running the master election algorithm to determine whether it is a master device that is responsible for transmitting a sync frame.

Operating in a NAN Cluster

A NAN device may continue operating in a NAN cluster as long as one of the following criteria is met:

The device receives at least one sync frame from the cluster with signal level exceeding a pre-determined threshold RSSI_C (e.g. −50 dBm).

The device operates as a master device transmitting sync frames.

When operating in a NAN cluster, a NAN device is responsible for maintaining both the base clock of the cluster by transmitting sync frames as needed, and the discovery window schedule of the cluster.

Master Election

In accordance with an example embodiment of the invention, a node, device, or STA may operate in one of two roles: As a Master STA, it competes with other Master STAs to transmit a Beacon, both for NAN synchronization and NAN discovery purposes. As a Non-Master STA, it may need to compete to transmit a Beacon, but only for NAN synchronization purposes. The Master Sync STA role may be determined by the Master Election Algorithm for Neighbor Awareness Networking. Every node, device, or STA of an ad hoc network may need to be able to operate in both roles and the Master Election Algorithm may need to be run by every node, device, or STA once in a while or periodically.

A NAN device that operates in a NAN cluster may need to be responsible for determining for each discovery window, as per the master election algorithm, whether it is a master device.

A Sync Frame from a Foreign Cluster

When a NAN device detects a sync frame of a NAN cluster different from the one in which the device operates, but both the clusters belong to the NAN network the device operates in, and the sync frame is received with signal level exceeding a pre-determined threshold RSSI_C (e.g. −50 dBm), the device proceeds as follows:

If the timestamp (e.g. TSF value) in the sync frame from the foreign cluster is larger than the time in one's own cluster, the device moves its operations to the foreign cluster.

Alternatively some other information in the sync frame from the foreign cluster is analyzed to determine whether the device moves its operations to the foreign cluster.

Otherwise the device continues its operations in the current cluster.

Moving Operations to a New Cluster

When a NAN device operates in a cluster, it shall do as follows when moving its operations to a new cluster upon detecting the existence of the new cluster through passive discovery:

a) If the device is a master device in the current/old cluster, the rules are as follows:

The device transmits as a master device in the current/old cluster at least one sync frame that contains information about the new cluster. This includes information at least about TSF value and discovery window schedule of the new cluster.

Once the device has transmitted at least one sync frame in the current/old cluster with information about the new cluster, it shall start operating in the new cluster and ceases all the operations in the old cluster.

b) If the device is a non-master device in the current/old cluster, the rules are as follows:

The device shall start operating in the new cluster and ceases all the operations in the old cluster.

D. NAN Cluster Concurrency Management

Example embodiments of the invention relate to implementation of Wi-Fi NAN for which an industry standard is under development in Wi-Fi Alliance's (WFA) Neighbor Awareness Networking (NAN) program. The objective is to have a low power method for Wi-Fi devices to discover services in other devices in proximity and make selected services in the device itself discoverable for others.

FIG. 1 illustrates an example NAN Discovery Engine 205, in accordance with an example embodiment of the invention.

The NAN discovery engine 205 is shown functionally positioned between the NAN MAC 210 and the services and applications 200 in a NAN device. Discovery is performed by the NAN Discovery Engine that provides publish and subscribe services for services/applications. Publish service is used when service/application wishes to make itself discoverable. Subscribe service is used to look for a specific service in another device in proximity. Publish service can be configured to operate with solicited transmissions only, with unsolicited transmissions only or with both unsolicited and solicited transmissions. With the solicited transmissions only, the publishing device publishes or transmits service advertisement (or publish) only upon receiving a subscribe message which indicates some device in proximity is looking for the published service. With the unsolicited transmissions only, the publishing device publishes or transmits service advertisement (or publish) messages whenever so required regardless of detected subscribe messages. The subscribe service looks for services in devices in proximity. When active subscribe service is used, the device transmits subscribe messages to invoke transmission of publish messages, but when passive subscribe service is used, the device listens for publish messages and filters out from those the messages that match with the search conditions. The NAN discovery engine 205 is shown with other example components, including the IEEE 802.11 MAC, in the functional block diagram of a NAN device, shown in FIG. 11.

Each publish/service instance is given at least a service name (UTF-8 string) which identifies the service/application and which is used in the NAN Discovery Engine to generate a 6-octet service identifier (SID) value using a specified hash function. This SID is used as the primary matching criterion when looking for specific services. Thus this SID is transmitted in each publish and subscribe message to allow the message receiver to check whether a match occurs or not. Each publish/service instance may also be given further criteria for service discovery. This is called a matching filter. If a matching filter is given, the NAN Discovery Engine needs to use not only the SID for matching, but also the matching filter information is used. The basic idea is that there has to be a perfect match between both the SID and the matching filter from a publisher and from a subscriber in order to have success in discovery. Whenever a matching filter is given to the NAN Discovery Engine for subscribe/publish purposes, this matching filter is also carried along with the SID in subscribe/publish messages.

Additionally, each publish/service instance may be given service specific information that is not used in discovery, itself, and not in matching, but it is information that is communicated to the service/application layer in case of a SID/matching filter match. Thus, this information is also carried in publish and subscribe messages to peer devices.

Both publish and subscribe messages are carried over the air in the form of a Service Descriptor Attribute (FIG. 5). Each attribute represents one publish or subscribe instance and contains at least a SID and optionally matching filter and service specific information. Service Descriptor Attributes are carried in NAN Service Discovery Frames (FIG. 2) which are vendor specific public action frames. A very limited amount of service discovery information may also be carried in NAN Beacon frames (FIG. 3) that may contain some of the NAN attributes (FIG. 4) in NAN information element (IE). One such an attribute is Service ID attribute (FIG. 5) that may contain a variable number of SIDs that may be set to indicate a selected set of published services. NAN Beacons and Service ID attributes within them may not be used for subscribe purposes, but one may indicate only published services and their SIDs.

FIG. 2 shows an example format of an example NAN Service Discovery Frame 140 that is an IEEE 802.11 management frame, transmitted by a wireless device in a NAN cluster, in accordance with at least one embodiment of the present invention. The NAN Service Discovery Frame 140 includes fields for Frame Control, Duration, Receive address (NAN Network ID), Transmit address, Cluster ID, Sequence Control, HT Control (presence indicated with the Frame Control), the NAN Service Discovery Frame Body 141, and a cyclic redundancy code (CRC). The NAN Service Discovery Frame Body 141 includes NAN attributes shown in FIG. 4, specifying, for example, service ID attributes. The service ID and service descriptor attributes are shown in FIG. 5, respectively. The service ID attribute may be used in beacon frames to indicate published services. The service descriptor attribute may be used in NAN Service Discovery Frame.

Figure 3:
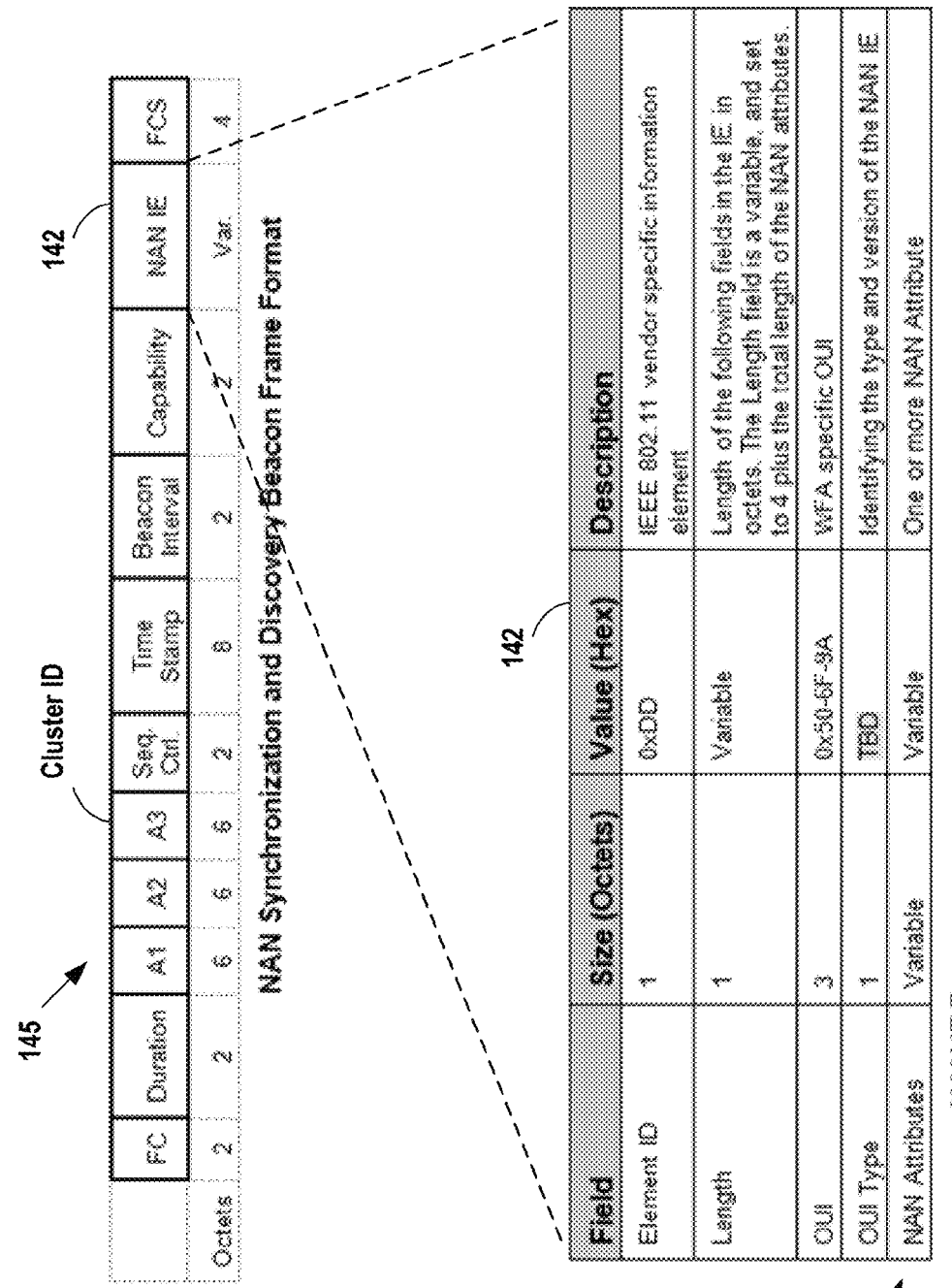
FIG. 3 illustrates an example IEEE 802.11 Beacon with a NAN information element (IE), in accordance with an example embodiment of the invention.

FIG. 3 shows an example format of an example IEEE 802.11 Beacon 145 with a NAN information element (IE) 142, transmitted by a master device and a non-master device in a sync state in a NAN cluster, in accordance with at least one embodiment of the present invention. The beacon packet 145 includes fields for destination address, source address, cluster ID, the NAN information element (IE) 142, and a cyclic redundancy code (CRC). The NAN information element (IE) 142 includes NAN attributes shown in FIG. 4, specifying, for example, service ID attributes. The service ID and service descriptor attributes are shown in FIG. 5, respectively.

Figure 6:
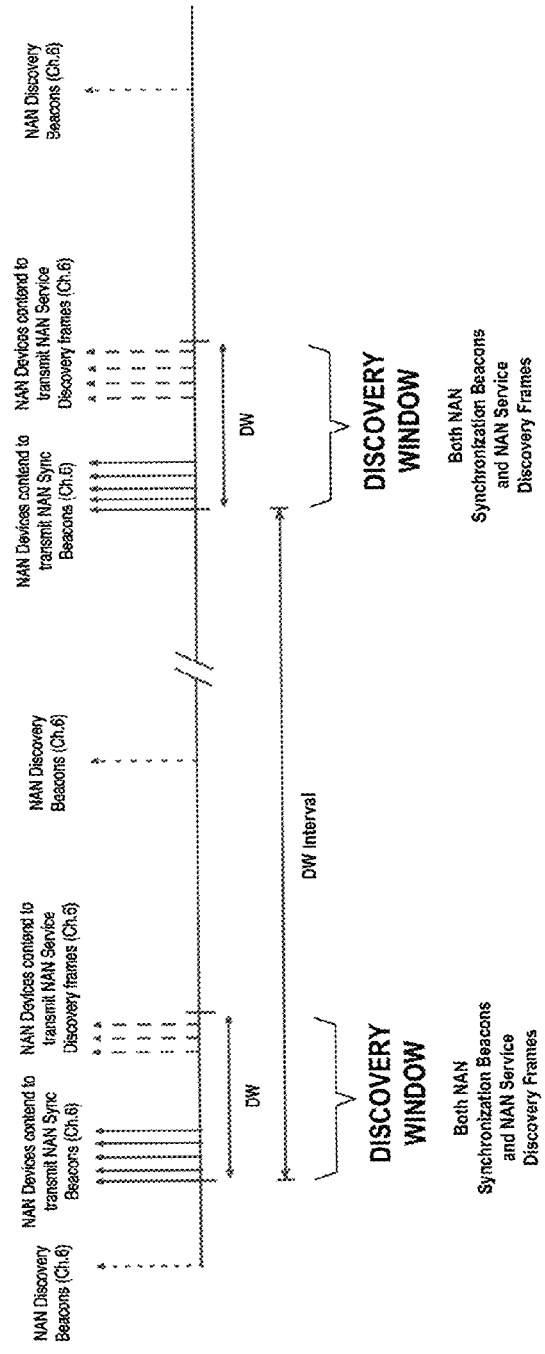
FIG. 6 illustrates an example Discovery Window in 2.4 GHz, in accordance with an example embodiment of the invention.

Both NAN Synchronization Beacons 145 and NAN Service Discovery Frames 140 are transmitted during Discovery Windows. The time and channel on which NAN Devices converge is called Discovery Window (DW) (FIG. 6). Each DW is 16 TUs (1.024 ms) long and time difference between start times of two consecutive DWs is 512 TUs. The assumption is that only NAN Discovery Beacons are transmitted outside the DWs.

Discovery Windows shall happen in the 2.4 GHz and specifically in channel 6. NAN Devices may also use the 5 GHz for NAN operation. If they do so, they schedule separate DWs for 2.4 GHz and 5 GHz. The 2.4 GHz DW schedule is, however, the basis of 5 GHz DW schedule. 5 GHz DWs will be equal in size with the ones in 2.4 GHz and in both bands the DW period is 512 TUs. The first DW in 5 GHz band is in offset of 128 TUs from the first DW in the 2.4 GHz band.

A NAN network comprises all NAN Devices that share a common set of NAN parameters that include: the time period between consecutive DWs, the time duration of the DWs, the beacon interval, and NAN channel(s). A NAN Cluster is a collection of NAN devices that share a common set of NAN parameters and are synchronized to the same DW schedule. A NAN Cluster is identified with the NAN Cluster identifier (ID). NAN devices that are part of the same NAN Cluster participate in the NAN Master selection procedure. That means in practice that each NAN device that operates in a NAN Cluster is responsible for participating in beaconing in the NAN Cluster.

FIG. 7A illustrates an example network diagram of two neighbor awareness network (NAN) clusters 50A and 50B, with anchor master A in NAN cluster 50A, with anchor master B in NAN cluster 50B, and a wireless device 60 in discovery mode, in accordance with at least one embodiment of the present invention. A set of NAN devices that operate in a NAN network with one NAN ID and that are synchronized with respect to both the sync frame transmissions and the discovery windows, form a NAN cluster. A NAN device in a NAN cluster will be either an anchor master device, a master device, a sync device, or a non-sync device. An anchor master, such as anchor master A in NAN cluster 50A, is the NAN device that has the highest master rank in the NAN cluster. A NAN master device, such as master device M2(A) in cluster 50A, sends discovery and synchronization beacons. A NAN sync device, such as sync device S5(A) in cluster 50A, sends synchronization beacons. Any of the masters in the example network diagram, but the anchor master, could be a sync state device. A NAN device in the non-sync state, such as non-sync device N6(A) in cluster 50A, does not send beacons. Each NAN cluster 50A and 50B includes a NAN anchor master A and B, respectively, whose TSF (time synchronization function) value is distributed in beacon frames to all the devices in the respective cluster.

For example, NAN cluster 50A includes NAN anchor master A whose TSF value TSF(A) is transmitted in its beacon frame B(A).

NAN master M2(A) in NAN cluster 50A, receives beacon B(A) in a first hop and transmits its beacon B(M2)(A).

NAN master M3(A) in NAN cluster 50A, receives beacon B(M2)(A) in a second hop and transmits its beacon B(M3) (A).

NAN master M4(A) in NAN cluster 50A, receives beacon B(M3)(A) in a third hop and transmits its beacon B(M4)(A).

Wireless device 60 in discovery mode receives beacon B(M4)(A) in a fourth hop.

The hop count is incremented by one as each master consecutively transmits its beacon in the hop sequence. The hop count value of 4 corresponding to the distance from the anchor master A to the final sending master M4(A), is communicated in the beacon frame B(M4)(A), which is received by the wireless device 60.

In another example, NAN cluster 50B includes NAN anchor master B whose TSF value TSF(B) is transmitted in its beacon frame B(B).

NAN master M2(B) in NAN cluster 50B, receives beacon B(B) in a first hop and transmits its beacon B(M2)(B).

NAN master M3(B) in NAN cluster 50B, receives beacon B(M2)(B) in a second hop and transmits its beacon B(M3) (B).

Wireless device 60 in discovery mode receives beacon B(M3)(B) in a third hop.

The hop count is incremented by one as each master consecutively transmits its beacon in the hop sequence. The hop count value of 3 corresponding to the distance from the anchor master B to the final sending master M3(B), is communicated in the beacon frame B(M3)(B), which is received by the wireless device 60.

An anchor master of a cluster is the device that has the highest master rank in the cluster. Each device maintains a master rank that represents the device's grade to operate as master. The higher the numerical master rank value, the higher the probability that the device becomes the anchor master of a cluster. Each beaconing device communicates its master rank information to other devices in its beacon frames. This received master rank information is used by each device receiving a beacon, to determine which master device is the anchor master whose TSF is to be followed. In one embodiment of the present invention the master rank comprises of three components: 1) master preference value, 2) random number, 3) device's MAC address. A higher numerical value of master preference means a device's higher preference to serve as a master. It may be that these three components are communicated in the beacon frames instead of the master rank itself. In this case the master rank of a NAN device may be calculated as follows:

master rank=master preference*2^56+random factor*2^48+MAC address

A device's rank also determines which role and state (master, sync state, or non-sync state) the device needs to assume and whether the device needs to transmit beacons. When a device transmits beacons, it not only communicates its own master rank and its own TSF value, but it also transmits information about the anchor master's master rank and the hop count distance from the anchor master to the transmitting device. The beacon frames contain all the information needed to synchronize in a cluster. In accordance with an example embodiment of the invention, the information in the beacons may be used by discovering devices to determine in which cluster they should select to operate in.

Figure 4:
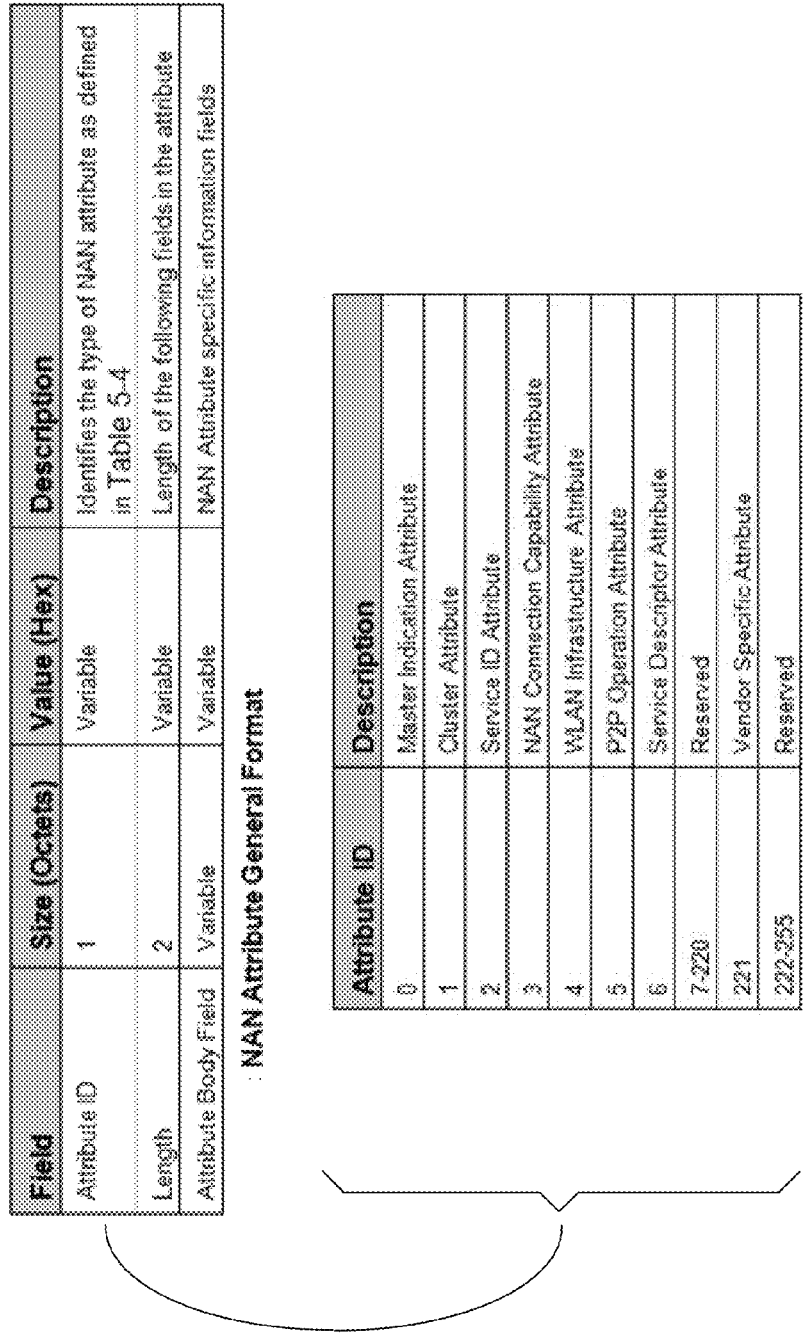
FIG. 4 illustrates an example NAN Attributes, in accordance with an example embodiment of the invention.

FIG. 7B shows an example format of a beacon packet 145 transmitted by a device in a NAN cluster, in accordance with at least one embodiment of the present invention. The beacon packet 145 includes fields for Frame Control, Duration, Destination Address, Source Address, Cluster ID, Sequence Control, TSF, Beacon Interval, the NAN Information Element (IE) 142, and a cyclic redundancy code (CRC). The NAN Information Element (IE) 142 is depicted in FIGS. 3, 4, and 5. The Master rank of the anchor master is carried in NAN IEs and more specifically in NAN attributes within the NAN IEs. The two most relevant NAN attributes in this context are the master indication attribute and the cluster attribute. The master indication attribute contains master preference and random factor of the device that transmitted the beacon. The MAC address is in the beacon header. These are the three components of the master rank and are used by a receiving device to determine the transmitting device's master rank.

Figure 7C:
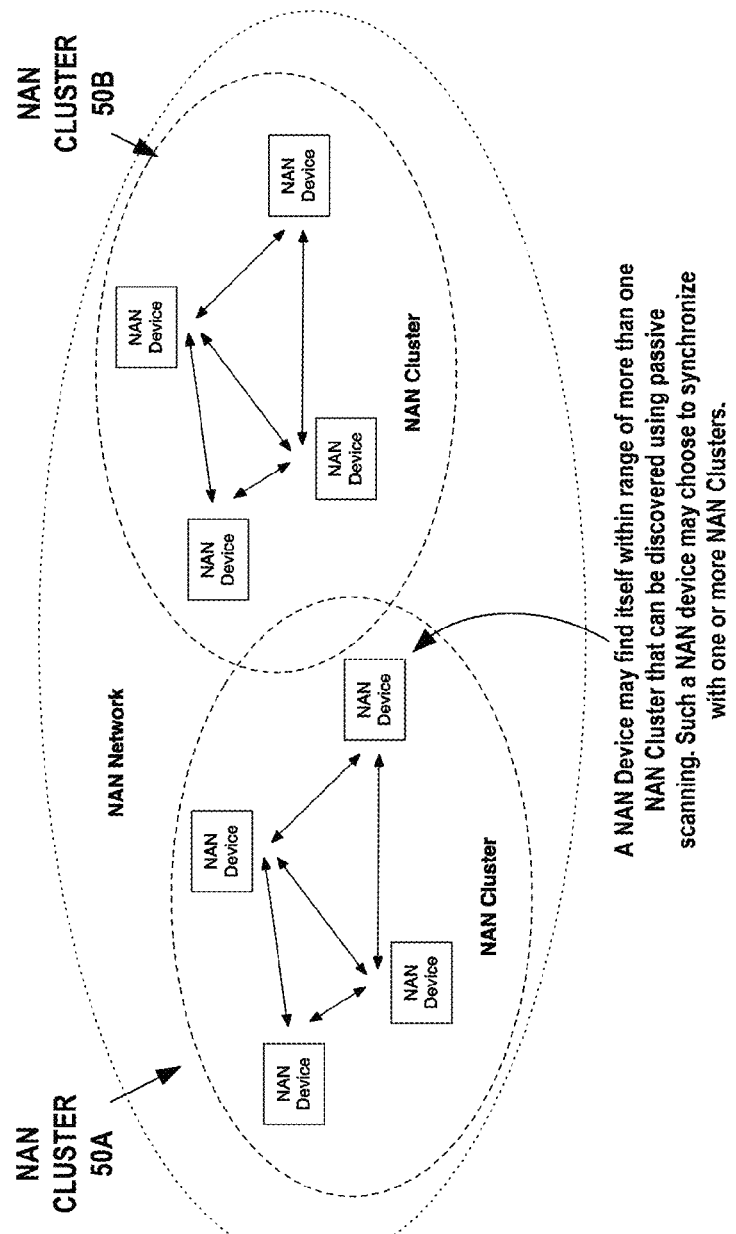
FIG. 7C illustrates an example NAN network with two overlapping NAN Clusters, in accordance with an example embodiment of the invention.

FIG. 7C illustrates an example NAN network with two overlapping NAN Clusters, in accordance with an example embodiment of the invention. At any given time a NAN Device may find itself within range of more than one NAN Cluster that can be discovered using passive scanning, as shown in FIG. 7C. Such a NAN device may choose to synchronize with one or more NAN Clusters. Alternatively, the two NAN Clusters may merge as NAN devices in one NAN Cluster, discover existence of the other NAN Cluster, and converge into a common NAN Cluster. Each NAN Cluster shall have a Cluster Grade (CG) that is determined as follows:

CG=2^64*A1+A2 where A1 is the master preference of the anchor master of the NAN Cluster and A2 is the 8-octet TSF value of the NAN Cluster. A NAN device determines the CG of its own NAN Cluster, scans for other NAN Clusters and determines the CGs of the discovered NAN Clusters. If one or more NAN Clusters with higher CG than the CG of the NAN device's current NAN Cluster are discovered, the NAN device moves its operations to the NAN Cluster with the highest CG. The NAN device may, however, continue also operating in the previous NAN Cluster if it is capable of operating in multiple NAN Clusters, concurrently. The CG based rule available in the NAN technical specification just tries to ensure that a maximum number of NAN devices operate in common NAN Cluster that is the NAN Cluster with the highest CG locally available.

Figure 8:
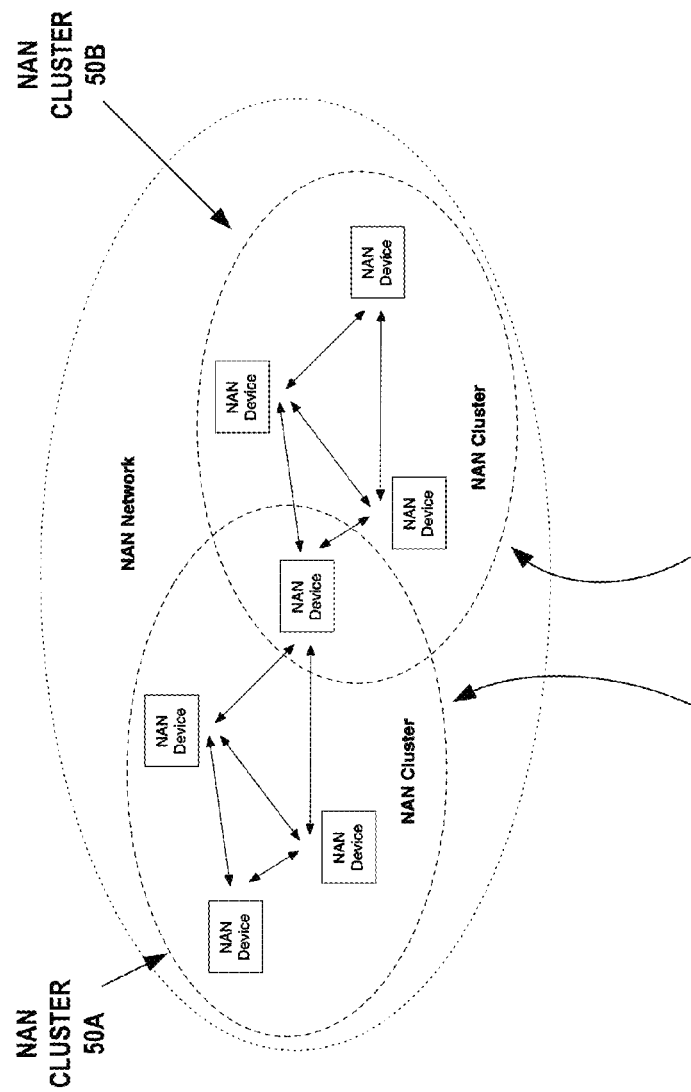
FIG. 8 illustrates an example A NAN device operating in two NAN Clusters concurrently, in accordance with an example embodiment of the invention.

FIG. 8 illustrates a case of two overlapping NAN Clusters with one of the NAN devices participating in both NAN Clusters. A NAN device may choose to participate in more than one NAN Cluster, e.g. to quickly discover all services offered by the NAN devices of all NAN Clusters within range. The details of such concurrent NAN Cluster operation are implementation specific. Such operation is optional and not described in the NAN technical specification.

There are no rules in the NAN technical specification that define when a NAN device that is capable of operating in multiple NAN Clusters concurrently uses the capability and in how many NAN Clusters it operates concurrently. Additionally, it is not clear in which NAN Clusters beyond the mandatory one (i.e. the NAN Cluster with the highest CG) the NAN device should operate in. A very simple rule could be just to maximize the number of NAN Clusters in which the NAN device operates. This approach could easily result in situations in which a NAN device operates in multiple NAN Clusters with all the same other NAN devices. This is not a proper solution since each NAN Cluster has its own schedule which means that a NAN device which operates in two NAN Clusters is active at least twice the time than a NAN device which operates in one NAN Cluster. Higher activity level means higher power consumption and if a NAN device doesn't benefit anything from operating in other NAN Cluster but the mandatory one, the device wastes power for nothing. Thus there needs to be rules that a NAN device implementation follows when determining a) whether to operate in other NAN Clusters, but the mandatory one, and b) in which other NAN Clusters, if any, may one operate.

In an example embodiment of the invention, a NAN device that is capable of concurrently operating in multiple NAN Clusters, has means to rank available NAN Clusters and use the results of the ranking when selecting the NAN Cluster(s) other than the NAN Cluster with the highest CG for operation. The NAN Cluster with the highest CG is always ranked first and example embodiments of the invention deal with ranking of other NAN Clusters. In an example embodiment of the invention, each NAN Cluster provides some level of discoverability and the objective of the NAN Cluster ranking is to have the NAN device operate in those NAN Clusters that maximize the overall discoverability. Here the term "discoverability" refers to a measure of amount of (desired) published and/or subscribed services. Each NAN Cluster comprises of a set of NAN devices that have published/subscribed services and consequently each NAN Cluster provides some level of discoverability that a NAN device tries to estimate. The estimate is used in the NAN Cluster ranking and in the NAN Cluster selection.

In an example embodiment of the invention, first time the ranking is done and the results are used when the NAN device takes the NAN in use after start-up. In this start-up phase the ranking is done based on information the NAN device has about the available NAN Clusters, acquired from NAN Beacons that it detects when scanning for the NAN Clusters. In an example embodiment of the invention, when the NAN device operates in at least one NAN Cluster (the operational phase), it maintains the ranking of available NAN Clusters; all the discovered NAN Clusters and the NAN Clusters in which the NAN device operates are counted as the available NAN Clusters. In the operational phase, the NAN device has more information about those NAN Clusters in which it operates, than about discovered NAN clusters on which only NAN Beacons and information within the beacons are the source of information. In the operational phase, the ranking is done based on in-depth information about those NAN Clusters in which the NAN device operates and based on the information the NAN device has about discovered NAN Clusters, extracted from NAN Beacons it detects when scanning for the NAN Clusters.

In an example embodiment of the invention, in the start-up phase all the available NAN Clusters are discovered NAN Clusters and the NAN device ranks them beyond the NAN Cluster with the highest CG per the following criteria:

1) The number of SIDs available in the Service ID attributes of received NAN Beacons from the NAN Cluster that are equal SIDs for which the NAN device has subscription(s); and 2) The CG of the NAN Cluster.

In other words, in the start-up phase, the NAN Clusters' discoverability is estimated based on information available in NAN Beacons. NAN Beacons provide very limited information about the cluster and especially about services available or searched in the cluster and thus the cluster selection rules in this phase are simple. The NAN device selects the additional NAN Clusters for operation per the ranking until it operates in as many NAN Clusters as it is capable of (implementation limitation or additional temporary limitation).

Alternatively, the available NAN Clusters are ranked based on their CGs only.

In an example embodiment of the invention, in the operational phase, the NAN device continues ranking the available NAN Clusters. In the operational phase, the available Clusters include the NAN Clusters in which the NAN device operates and all the discovered NAN Clusters. The discovered NAN Clusters are ranked as in the start-up phase, using the information available in the NAN Beacons. In the operational phase, the NAN device has more information about those NAN Clusters in which it operates or in which it has recently operated and that information is used in the ranking. In an example embodiment of the invention, the NAN device may maintain statistics and/or characteristics of the NAN Clusters in which it operates to fine tune the ranking. As an example, the NAN device may maintain a list of device addresses for each NAN Cluster in which it operates and compare them against each other to measure how similar the NAN Clusters are from NAN device setup perspective. Another measure may be the number of SID matches between the NAN device's publishes/subscribes and received subscribe/publish messages in the NAN Cluster. The NAN device may also maintain some history information on those NAN Clusters in which it has operated recently. If a NAN Cluster in which the NAN device has recently operated is still discoverable, the NAN device combines this history information with the information available in the NAN Beacons from that NAN Cluster and uses the combined information in the ranking List of Available NAN Clusters In an example embodiment of the invention, a NAN device may maintain a list of available NAN Clusters, which contains those NAN Clusters in which the NAN device operates and those other NAN Clusters that have been discovered. If a NAN device has received a NAN Beacon from a NAN Cluster different from one in which the NAN device has recently operated not longer than e.g. 5 seconds ago, the NAN device considers the NAN Cluster discovered. The list contains at least three different type of information on each available NAN Cluster: 1) Identification information, 2) Measure of discoverability, 3) Ranking result. The basic format is illustrated in FIG. 9a. Each information type may comprise multiple different information items. Thus, each information type column in the FIG. 9a may be further split into one or more columns, one for each information item related to the type. In all implementations, the measure of discoverability is used to determine the ranking result. The ranking algorithm is discussed further below.

In an example embodiment of the invention, an example of further division of the information types is given in FIG. 9b for the list of available NAN Clusters. In the example, the NAN Cluster with the highest CG is not considered and it's not included in the list of available NAN Clusters. In the example, the Cluster ID is the cluster identification and the measure of discoverability information comprises of two subsets of information: 1) Measure of discoverability available from NAN Beacons, and 2) Measure of discoverability obtained by participating in the NAN Cluster. In the example, the available NAN Clusters are ordered per the Cluster ID. Alternatively, the ranking result could be used to order the available NAN Clusters.

In an example embodiment of the invention, the first subset in FIG. 9b, further comprises two information items: a) Cluster Grade (CG), and b) Number of SID matches based on received NAN Beacons. The CG is set according to the CG of the NAN Cluster and the number of SID matches indicates the number of SIDs available in the Service ID attributes of received NAN Beacons from the NAN Cluster that are equal SIDs for which the NAN device has subscription(s).

In an example embodiment of the invention, the second subset in FIG. 9b, further comprises three information items: a) Device count, b) Number of SID matches based on all NAN frames received when operating in the NAN Cluster, and c) New device count. These information items reflect the NAN Cluster discoverability per either the current or the last operation in the NAN Cluster. The device count indicates the estimated number of neighboring or all NAN Devices in the NAN Cluster. The SID match count is set to indicate the number of SID matches between the NAN device's publishes/subscribes and received subscribe/publish messages (NAN Beacons and NAN service discovery frames) in the NAN Cluster. The new device count is the number of NAN devices that have not been detected in the NAN Cluster with the highest CG, but that have been detected to operate in this NAN Cluster.

In an example embodiment of the invention, FIG. 9b shows two other information items: a) Time since the last use of the NAN Cluster, b) Rank. The time column indicates how long time ago the NAN device operated in the NAN Cluster. In the example case the column indicates the time in seconds and the value '0' is used to indicate that the NAN device operates in the NAN Cluster and the value '99999' is used to indicate that the NAN device has not operated in the NAN Cluster at least recently and the discoverability measure information obtained from the NAN Cluster operations are not valid/available. The rank item indicates the results of the ranking. In the example case in FIG. 9b, the design is such that each rank is a weight which indicates the time proportion the NAN device intends to spend in each NAN Cluster. In the example case, the NAN device is capable of operating in three NAN Clusters concurrently (the NAN Cluster with the highest CG and two other NAN Clusters). The cumulative sum of the weights across all the available NAN Clusters in the list is 200 and each individual weight has a value in the range of 0-100. Value '0' means that the NAN device does not participate in the NAN Cluster at all. Value '100' means that the NAN device participates in the NAN Cluster full time. An intermediate value (1-99) represents the average percentage of time the NAN device participates in the NAN Cluster. In the example case the NAN device spends 35% of time in the NAN Cluster with Cluster ID A, 50% of time in the NAN Clusters with Cluster ID B, 80% of time in the NAN Clusters with Cluster ID C, 5% of time in the NAN Cluster with Cluster ID D and 30% of time in the NAN Cluster with Cluster ID E. In one embodiment of the invention, weight can have only two values, '0' or '100', with the meaning of the values as described above. In the example case, this would mean that the NAN Cluster with Cluster ID B and the NAN Cluster with Cluster ID C would be given rank value '100' and all the other NAN Clusters would be given rank value '0'. In this case the NAN device would spend full time in the NAN Clusters with Cluster ID B and C and no time would be spent on the other NAN Clusters. One may also implement ranking in such a way that one picks up those NAN Clusters that have the highest rank and assign weight 100 to as many clusters as one can operate concurrently. All the others are given weight 0. According to this approach, one operates full time in those clusters which have the highest rank until one operates in as many clusters as one can.

In an example embodiment of the invention, a NAN device may discard from a list of available NAN Clusters such a NAN Cluster which has the same anchor master as any of the other NAN Clusters that has a higher rank. If a NAN device discovers more than one NAN Clusters which appear to have same anchor master, the NAN device may assume that the NAN Clusters with the same anchor master have reasonably same set of NAN devices and one may ignore every other of those NAN Clusters but the one with the highest rank. A NAN device may consider two or more NAN Clusters to have same anchor master if the anchor master rank of the NAN Clusters is equal. A NAN device may also consider only the MAC address component of the anchor master rank when comparing anchor master rank of two or more NAN Clusters to determine whether the NAN Clusters have the same anchor master.

Start-Up Phase

In an example embodiment of the invention, once a NAN device has completed passive scanning to discover existing NAN Clusters, it creates a list of available NAN Clusters (excluding the NAN Cluster with the highest CG) and ranks the list elements as follows:

1) First level ranking is done based on the number of SIDs that are decoded from the Service ID attributes of received NAN Beacons from the NAN Cluster, and that are equal to SIDs for which the NAN device has subscription(s). The higher the number, the higher the rank.

2) When there are multiple NAN Clusters with the same number of matching SIDs, the NAN Clusters are ranked based on CG. The higher the CG, the higher the rank.

The NAN device selects the additional NAN Clusters for operation from the top of the rank in the decreasing rank order until it operates in as many NAN Clusters as it is capable of (implementation limitation or additional temporary limitation).

An example is illustrated in FIG. 10a of a NAN Cluster list showing a list with the same setting of available NAN Clusters as in FIG. 9b. There are five NAN Clusters available and the NAN device is capable of operating in two NAN Clusters concurrently beyond the NAN Cluster with the highest CG. The NAN device ranks the NAN Clusters per the criteria above and gives weights for each of the NAN Clusters accordingly, i.e. the higher the rank the higher the weight. In the example case, the NAN Cluster C was ranked first with weight of 70, the NAN Cluster B was ranked second with weight of 60, etc. The NAN Cluster D was ranked last and it was given weight of 0 which means that the NAN device doesn't operate in that NAN Cluster at all.

An alternative approach is to ignore the first step in the ordering and base all the ordering on the CG only. Then the order of the NAN Clusters after the ranking would be B, E, C, A, D, instead. Weights could be still the same as in the example case, but the weights would be assigned to different NAN Clusters according to the ranks.

In an example embodiment of the invention, once the ranking has been completed, the NAN device uses the NAN Cluster specific weights in the NAN Cluster selection and scheduling to determine in which of the NAN Clusters the NAN device starts operating. In the example case, it is most probable that the device starts operating in the NAN Clusters C and B, since they have the highest weight/rank of all the available NAN Clusters. Once the NAN device has started operating in the NAN Cluster with the highest CG and the NAN Clusters C and B, the device enters into the operational phase and performs NAN Cluster ranking per the rules described below.

Operational Phase

In an example embodiment of the invention, in the operational phase, the NAN device keeps on maintaining the list of available NAN Clusters and performs ranking once in a while. On default, the NAN device performs passive scanning periodically to discover NAN Clusters and after each scan, the NAN device updates the list by deleting the NAN Clusters which are no longer available and adding the NAN Clusters that were discovered, but which were not available in the list. A NAN device may also use any NAN Beacon received at any time from a NAN Cluster other than the NAN Clusters in which the device operates as a scan result and update the list accordingly. One may determine that a NAN Cluster is no longer available if no NAN Beacon was received from the NAN Cluster during a scan period or between two consecutive scan periods. Alternatively, one may have an implementation in which one needs to experience e.g. 3 consecutive scan periods without a NAN Beacon from the NAN Cluster, before deeming the NAN Cluster is no longer available.

In an example embodiment of the invention, the NAN device analyses discoverability performance of those NAN Clusters in which it operates, and stores the results in the list described earlier. The device keeps track of an estimated number of devices in the NAN Cluster. Additionally, the device keeps track of SID matches based on all the exchanged NAN frames (NAN Beacons and NAN service discovery frames) in the NAN Cluster. The device analyses how many NAN devices there are in the NAN Cluster that have not been detected in the NAN Cluster with the highest CG. Additionally, the NAN device maintains in the list, a timer per NAN Cluster, which indicates whether the device operates in the NAN Cluster at a time or how long time ago, e.g. in seconds, the device operated in the NAN Cluster. This timer is used as the validity indicator of the discoverability measures obtained while the NAN device operated in the NAN Cluster. The larger the time value, the less valid the discoverability measures are. The less valid the measures, the less weight the NAN device puts on them in the ranking After a certain timer value only the discoverability measures from the NAN Beacons matter.

In an example embodiment of the invention, the ranking is done primarily using the discoverability measure obtained NAN discovery frames exchanged while operating in the NAN Cluster. The SID matches based on NAN Beacons measured during scanning is ignored in this ranking until the discoverability measures from the NAN Cluster operation time are deemed invalid. The CG is used all the time in the ranking process. Otherwise the three measures from the NAN Cluster operation are used in the ranking In an example embodiment of the invention, in the example case illustrated in FIG. 10b of a NAN Cluster list, the rank values, i.e. the NAN Cluster weights, have been determined using the following formula:

$$\text{unscaled\_weight} = \text{new\_device\_count} * \text{device\_count} / \text{SID\_match\_all\_frames}$$

The unscaled_weight values have been scaled to the range of 1-100 as described earlier with the objective of accumulative sum of 200.

The example case is a snapshot of the case illustrated in FIG. 10a after a while when the NAN device has operated in few NAN Clusters and updated the list and performed ranking per the rules described above. At the time of the snapshot the NAN device operates in the NAN Clusters A and B. It has left the NAN Cluster C 5 seconds ago and has started operating in either the NAN Cluster A or B. Once the NAN device has started its NAN operations, it has operated in all the other NAN Clusters except in D, and during the periods of operation in the NAN Clusters, it has analysed the discoverability of the NAN Cluster and stored the results in the list.

In an example embodiment of the invention, the NAN device may identify a plurality of wireless network clusters by receiving wireless synchronization messages, such as beacon frames, from one or more member devices of each of the plurality of wireless network clusters. The NAN device may calculate a cluster grade for each of the plurality of identified wireless network clusters based on information of the received beacon frames. The NAN device may select a wireless network cluster from the plurality of identified wireless network clusters, having a highest cluster grade for joining and operating in the wireless network cluster. The NAN device may rank non-selected wireless network clusters based on predefined criteria applied to information received by the device characterizing the non-selected wireless network clusters. The predefined criteria may include counting a respective number of at least one of published and subscribed services for member devices of each of the non-selected wireless network clusters. Alternately, the predefined criteria may be based on cluster grades calculated for each of the non-selected wireless network clusters.

In an example embodiment of the invention, the NAN device may determine whether to operate in one or more of the non-selected wireless network clusters based on the ranking of the non-selected wireless network clusters. The NAN device may determine time allocations for operation in the one or more of the non-selected wireless network clusters based on the ranking of the one or more non-selected wireless network clusters. The NAN device may compare the respective counts of the at least one of published and subscribed services for the member devices of each of the non-selected wireless network clusters. The NAN device may rank a wireless network cluster having a highest count from the non-selected wireless network clusters, as the highest ranked wireless network cluster from the non-selected wireless network clusters.

In an example embodiment of the invention, the NAN device may rank a wireless network cluster having a highest cluster grade as highest ranked wireless network cluster from the non-selected wireless network clusters, if the respective counts are equivalent for the non-selected wireless network clusters.

In an example embodiment of the invention, the NAN device may control a number of wireless network clusters that the device is capable of concurrently operating in, based on at least one of a battery level of a battery powering the device and a duration required for the device to perform other operations.

In an example embodiment of the invention, the NAN device may maintain a list of available wireless network clusters, the list containing those wireless network clusters in which the device operates or has recently operated, and those other wireless network clusters that have been discovered by receiving one or more messages from wireless devices in the other wireless network clusters. The NAN device may passively scan to discover wireless network clusters and after each scan, update the list by deleting wireless network clusters that are no longer available.

Controlling the Number of NAN Clusters a NAN Device is Capable of Operating Concurrently In an example embodiment of the invention, the NAN device has means to control the number of NAN Clusters in which it is capable of concurrently operating. The upper limit is always the physical limitation of the device, but the device may temporarily limit the number further, as an example, per the following principles:

a) When the battery level drops down to certain predefined levels, the device reduces the number of NAN Clusters with which it can concurrently operate. Similarly, the device may increase the number of NAN Clusters with which it can concurrently operate, once the battery level exceeds certain predefined levels.

b) When the device needs to accommodate more time for other operations like Wi-Fi infrastructure mode, Wi-Fi Direct mode, or some other radio technology, such as Bluetooth or LTE, the device may reduce the number of NAN Clusters with which it can concurrently operate. Similarly, the number can be increased when the need for more time for other modes or radio technologies is over.

In an example embodiment of the invention, the NAN device has a control interface through which the NAN stack may be configured with respect to the number of NAN Clusters in which the device is capable of operating. In an example embodiment of the invention, this feature is implemented as part of the interface which is illustrated in FIG. 1 as the "NAN Control Primitives".

FIG. 11 illustrates an example functional block diagram of two NAN devices, a NAN publisher wireless device 110 and a NAN subscriber wireless device 100, in accordance with at least one embodiment of the present invention. Wireless device 110 is shown broadcasting the NAN Service Discovery Frame packet 140 advertising the NAN identity (ID) of the publisher 110. The wireless device 100 that is shown functioning as a NAN subscriber receiving the NAN Service Discovery Frame 140, determining its rank, and storing it in the List of available NAN Clusters 150, in accordance with at least one embodiment of the present invention.

In an example embodiment of the invention, the wireless device 100 and the wireless device 110 may be a communications device, PDA, cell phone, laptop or palmtop computer, or the like or it may be a stationary access point, automotive dashboard interface, home electronics interface or other stationary interface or device. The wireless device 110 and the wireless device 100 may be a remote controller, healthcare monitor, sports sensor, token, key fob, watch, wireless keyboard, gaming pad, body sensor, toy, health care equipment, human interface device, entertainment device, wireless microphone, GPS sensor, or the like.

In an example embodiment of the invention, the wireless device 110 and the wireless device 100 may include a processor 220 that includes a single core or multi-core central processing unit (CPU) 260 and 261, a random access memory (RAM) 262, a read only memory (ROM) 264, and interface circuits 266 to interface with the radio transceiver 208. The wireless device 110 and the wireless device 100 may each further include a battery and other power sources, key pad, touch screen, display, microphone, speakers, ear pieces, camera or other imaging devices, etc. The RAM 262 and ROM 264 may be removable memory devices shown in FIG. 13, such as smart cards, SIMs, WIMs, semiconductor memories such as RAM, ROM, PROMS, flash memory devices, etc.

according to an embodiment of the present invention. According to an example embodiment of the invention, the wireless device 110 and the wireless device 100 each include the awareness protocol stack 202.

In an example embodiment of the invention, the awareness protocol stack 202 may include the NAN discovery engine 205 and the NAN 210. In an example embodiment of the invention, the awareness protocol stack 202 may include an Awareness Layer, Community Layer, Network Layer, and Link Layer. In an example embodiment of the invention, the awareness protocol stack 202 may include the IEEE 802.11 protocol stack 215.

In an example embodiment of the invention, the processor 220, protocol stack 202 and/or application program 200 may be embodied as program logic stored in the RAM 262 and/or ROM 264 in the form of sequences of programmed instructions which, when executed in the CPUs 260 and/or 261, carry out the functions of the disclosed embodiments. The program logic may be delivered to the writeable RAM, PROMS, flash memory devices, etc. 262 of the wireless device 110 and the wireless device 100 from a computer program product or article of manufacture in the form of computer-usable media such as resident memory devices, smart cards or other removable memory devices, as illustrated in FIG. 13. Alternately, they may be embodied as integrated circuit logic in the form of programmed logic arrays or custom designed application specific integrated circuits (ASIC). The radio 208 in the each of the wireless device 110 and the wireless device 100 may be separate transceiver circuits or alternately, the radio 208 may be a single radio module capable of handling one or multiple channels in a high speed, time and frequency multiplexed manner in response to the processor 220. The program code for instructing the apparatus to perform its various operations may be stored in computer readable media, for example magnetic disks, CD ROMS, or flash memory devices. The program code may be downloaded from such computer readable media to be stored for example in the RAM 262 or programmable ROM 264 of the wireless device 110 and the wireless device 100 for execution of the program code for example by the CPUs 260 and/or 261. Removable storage media 126 are shown in FIG. 13.

In an example embodiment of the invention, the wireless device 110 buffers the specified neighbor awareness network (NAN) identity and service IDs to be advertised, in the buffer 151.

In an example embodiment of the invention, the wireless device 100 has previously buffered the neighbor awareness network (NAN) identity in which it has recently operated, in buffer 150. The buffer 150 may store history information on those neighbor awareness network clusters in which device 100 has recently operated. If a neighbor awareness network cluster in which the device 100 has recently operated is still discoverable, then the history information may be combined with information available from received messages from the still discoverable neighbor awareness network cluster and the combined information may be used in ranking the still discoverable neighbor awareness network cluster.

Figure 12:
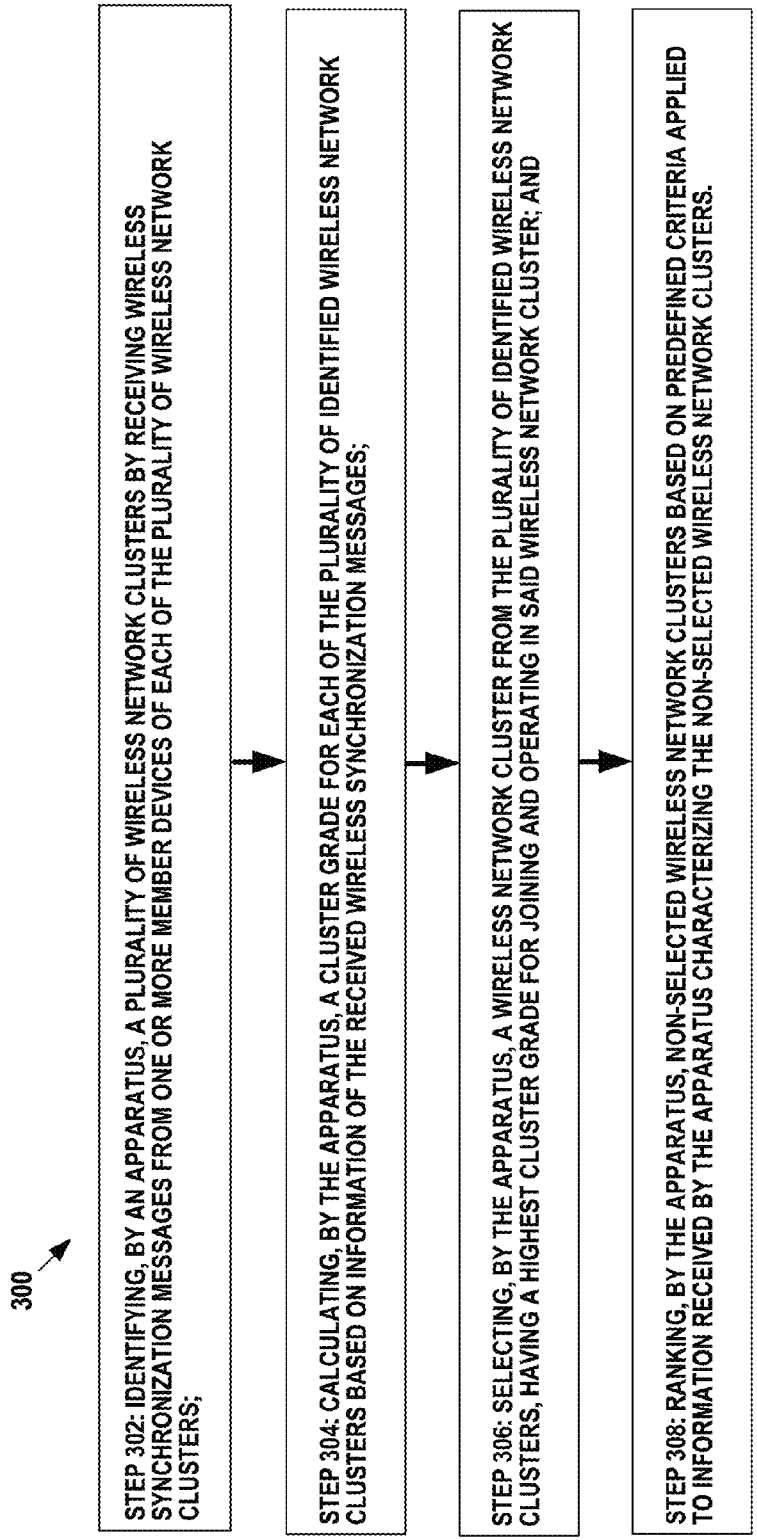
FIG. 12 illustrates an example flow diagram of operational steps of a NAN device, in accordance with at least one embodiment of the present invention.

FIG. 12 illustrates an example flow diagram 300 of operational steps of a NAN device, in accordance with at least one embodiment of the present invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 302: identifying, by an apparatus, a plurality of wireless network clusters by receiving wireless synchronization messages from one or more member devices of each of the plurality of wireless network clusters;

Step 304: calculating, by the apparatus, a cluster grade for each of the plurality of identified wireless network clusters based on information of the received wireless synchronization messages;

Step 306: selecting, by the apparatus, a wireless network cluster from the plurality of identified wireless network clusters, having a highest cluster grade for joining and operating in said wireless network cluster; and Step 308: ranking, by the apparatus, non-selected wireless network clusters based on predefined criteria applied to information received by the apparatus characterizing the non-selected wireless network clusters.

FIG. 13 illustrates examples of removable storage media in a NAN device, in accordance with an example embodiment of the invention. Examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

Although specific example embodiments have been disclosed, a person skilled in the art will understand that changes can be made to the specific example embodiments without departing from the spirit and scope of the invention.

What is claimed is:

1. A method, comprising:
   identifying, by an apparatus, a plurality of wireless network clusters by receiving wireless synchronization messages from one or more member devices of each of the plurality of wireless network clusters;
   calculating, by the apparatus, a cluster grade for each of the plurality of identified wireless network clusters based on information of the received wireless synchronization messages;
   selecting, by the apparatus, a wireless network cluster from the plurality of identified wireless network clusters, having a highest cluster grade for joining and operating in said wireless network cluster; and
   ranking, by the apparatus, non-selected wireless network clusters for concurrent operation, while operating in said selected cluster, based on predefined criteria applied to service identifier information received by the apparatus characterizing the non-selected wireless network clusters.

2. The method of claim 1, further comprising:
   determining, by the apparatus, whether to operate in one or more of the non-selected wireless network clusters based on the ranking of the non-selected wireless network clusters.

3. The method of claim 2, further comprising:
   determining, by the apparatus, time allocations for operation in the one or more of the non-selected wireless network clusters based on the ranking of said one or more non-selected wireless network clusters.

4. The method of claim 1, further comprising:
   wherein the predefined criteria includes counting a respective number of at least one of published and subscribed services for member devices of each of the non-selected wireless network clusters.

5. The method of claim 4, further comprising:
comparing, by the apparatus, the respective counts of the at least one of published and subscribed services for the member devices of each of the non-selected wireless network clusters; and
ranking, by the apparatus, a wireless network cluster having a highest count from the non-selected wireless network clusters as highest ranked wireless network cluster from the non-selected wireless network clusters.

6. The method of claim 5, further comprising:
ranking, by the apparatus, a wireless network cluster having a highest cluster grade as highest ranked wireless network cluster from the non-selected wireless network clusters, if the respective counts are equivalent for the non-selected wireless network clusters.

7. The method of claim 1, further comprising:
wherein the predefined criteria is based on cluster grades calculated for each of the non-selected wireless network clusters.

8. The method of claim 1, further comprising:
maintaining, by the apparatus, a list of available wireless network clusters, the list containing those wireless network clusters in which the apparatus operates or has recently operated, and those other wireless network clusters that have been discovered by receiving one or more wireless synchronization messages from wireless devices in the other wireless network clusters.

9. The method of claim 1, further comprising:
maintaining, by the apparatus, a list of available wireless network clusters, the list containing those wireless network clusters in which the apparatus operates or has recently operated, and those other wireless network clusters that have been discovered by receiving one or more wireless synchronization messages from wireless devices in the other wireless network clusters; and
passively scanning, by the apparatus, to discover wireless network clusters and after each scan, updating the list by deleting wireless network clusters that are no longer available.

10. The method of claim 1, further comprising:
controlling, by the apparatus, a number of wireless network clusters that the apparatus is capable of concurrently operating in, based on at least one of a battery level of a battery powering the apparatus and a duration required for the apparatus to perform other operations.

11. An apparatus, comprising:
at least one processor;
at least one memory including computer program code;
the at least one memory and the computer program code configured to, with the at least one processor, cause the apparatus at least to:
identify a plurality of wireless network clusters by receiving wireless synchronization messages from one or more member devices of each of the plurality of wireless network clusters;
calculate a cluster grade for each of the plurality of identified wireless network clusters based on information of the received wireless synchronization messages;
select a wireless network cluster from the plurality of identified wireless network clusters, having a highest cluster grade for joining and operating in said wireless network cluster; and
rank non-selected wireless network clusters for concurrent operation, while operating in said selected cluster, based on predefined criteria applied to service identifier information received by the apparatus characterizing the non-selected wireless network clusters.

12. The apparatus of claim 11, further comprising:
the at least one memory and the computer program code configured to, with the at least one processor, cause the apparatus at least to:
determine whether to operate in one or more of the non-selected wireless network clusters based on the ranking of the non-selected wireless network clusters.

13. The apparatus of claim 12, further comprising:
the at least one memory and the computer program code configured to, with the at least one processor, cause the apparatus at least to:
determine time allocations for operation in the one or more of the non-selected wireless network clusters based on the ranking of said one or more non-selected wireless network clusters.

14. The apparatus of claim 11, further comprising:
wherein the predefined criteria includes counting a respective number of at least one of published and subscribed services for member devices of each of the non-selected wireless network clusters.

15. The apparatus of claim 14, further comprising:
the at least one memory and the computer program code configured to, with the at least one processor, cause the apparatus at least to:
compare the respective counts of the at least one of published and subscribed services for the member devices of each of the non-selected wireless network clusters; and
rank a wireless network cluster having a highest count from the non-selected wireless network clusters as highest ranked wireless network cluster from the non-selected wireless network clusters.

16. The apparatus of claim 15, further comprising:
the at least one memory and the computer program code configured to, with the at least one processor, cause the apparatus at least to:
rank a wireless network cluster having a highest cluster grade as highest ranked wireless network cluster from the non-selected wireless network clusters, if the respective counts are equivalent for the non-selected wireless network clusters.

17. The apparatus of claim 11, further comprising:
wherein the predefined criteria is based on cluster grades calculated for each of the non-selected wireless network clusters.

18. The apparatus of claim 11, further comprising:
the at least one memory and the computer program code configured to, with the at least one processor, cause the apparatus at least to:
maintain a list of available wireless network clusters, the list containing those wireless network clusters in which the apparatus operates or has recently operated, and those other wireless network clusters that have been discovered by receiving one or more wireless synchronization messages from wireless devices in the other wireless network clusters.

19. The apparatus of claim 11, further comprising:
the at least one memory and the computer program code configured to, with the at least one processor, cause the apparatus at least to:
maintain a list of available wireless network clusters, the list containing those wireless network clusters in which the apparatus operates or has recently operated, and those other wireless network clusters that have been discovered by receiving one or more wireless synchronization messages from wireless devices in the other wireless network clusters; and passively scanning, by the apparatus, to discover wireless network clusters and after each scan, updating the list by deleting wireless network clusters that are no longer available.

20. The apparatus of claim 11, further comprising:
the at least one memory and the computer program code configured to, with the at least one processor, cause the apparatus at least to:
control a number of wireless network clusters that the apparatus is capable of concurrently operating in, based on at least one of a battery level of a battery powering the apparatus and a duration required for the apparatus to perform other operations.

21. A computer program product comprising computer executable program code recorded on a computer readable non-transitory storage medium, the computer executable program code comprising:

code for identifying, by an apparatus, a plurality of wireless network clusters by receiving wireless synchronization messages from one or more member devices of each of the plurality of wireless network clusters;

code for calculating, by the apparatus, a cluster grade for each of the plurality of identified wireless network clusters based on information of the received wireless synchronization messages;

code for selecting, by the apparatus, a wireless network cluster from the plurality of identified wireless network clusters, having a highest cluster grade for joining and operating in said wireless network cluster; and code for ranking, by the apparatus, non-selected wireless network clusters for concurrent operation, while operating in said selected cluster, based on predefined criteria applied to service identifier information received by the apparatus characterizing the non-selected wireless network clusters.

* * * * *